(12) United States Patent
Chen et al.

(10) Patent No.: US 10,901,178 B2
(45) Date of Patent: Jan. 26, 2021

(54) OPTICAL IMAGING LENS

(71) Applicant: GENIUS ELECTRONIC OPTICAL (XIAMEN) CO., LTD., Fujian (CN)

(72) Inventors: Feng Chen, Fujian (CN); Yanbin Chen, Fujian (CN); Yongfeng Lai, Fujian (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 111 days.

(21) Appl. No.: 16/278,174

(22) Filed: Feb. 18, 2019

(65) Prior Publication Data
US 2020/0209550 A1 Jul. 2, 2020

(30) Foreign Application Priority Data
Dec. 28, 2018 (CN) .......................... 2018 1 1625438

(51) Int. Cl.
| | |
|---|---|
| *G02B 13/00* | (2006.01) |
| *G02B 9/34* | (2006.01) |
| *G02B 5/00* | (2006.01) |
| *G02B 13/18* | (2006.01) |
| *G02B 27/00* | (2006.01) |
| *G02B 13/16* | (2006.01) |

(52) U.S. Cl.
CPC ............. *G02B 13/004* (2013.01); *G02B 9/34* (2013.01); *G02B 5/005* (2013.01); *G02B 13/16* (2013.01); *G02B 13/18* (2013.01); *G02B 27/0025* (2013.01)

(58) Field of Classification Search
CPC ........ G02B 13/004; G02B 9/34; G02B 13/18; G02B 5/005; G02B 27/0025; G02B 13/16
USPC ................ 359/715, 739, 740, 771, 772, 779
See application file for complete search history.

(56) References Cited

U.S. PATENT DOCUMENTS 8,189,272 B1 * 5/2012 Huang ................ G02B 13/004
359/715

\* cited by examiner

*Primary Examiner* — Evelyn A Lester
(74) *Attorney, Agent, or Firm* — JCIPRNET

(57) ABSTRACT

An optical imaging lens including a first lens element, a second lens element, a third lens element, and a fourth lens element arranged in sequence from an object side to an image side along an optical axis is provided. Each lens element includes an object-side surface and an image-side surface. A periphery region of an image-side surface of the first lens element is convex, an optical axis region of an image-side surface of the second lens element is convex, and a periphery region of an object-side surface of the third lens element is convex. An optical axis region of an object-side surface of the fourth lens element is convex, and a periphery region of the object-side surface of the fourth lens element is concave.

20 Claims, 22 Drawing Sheets

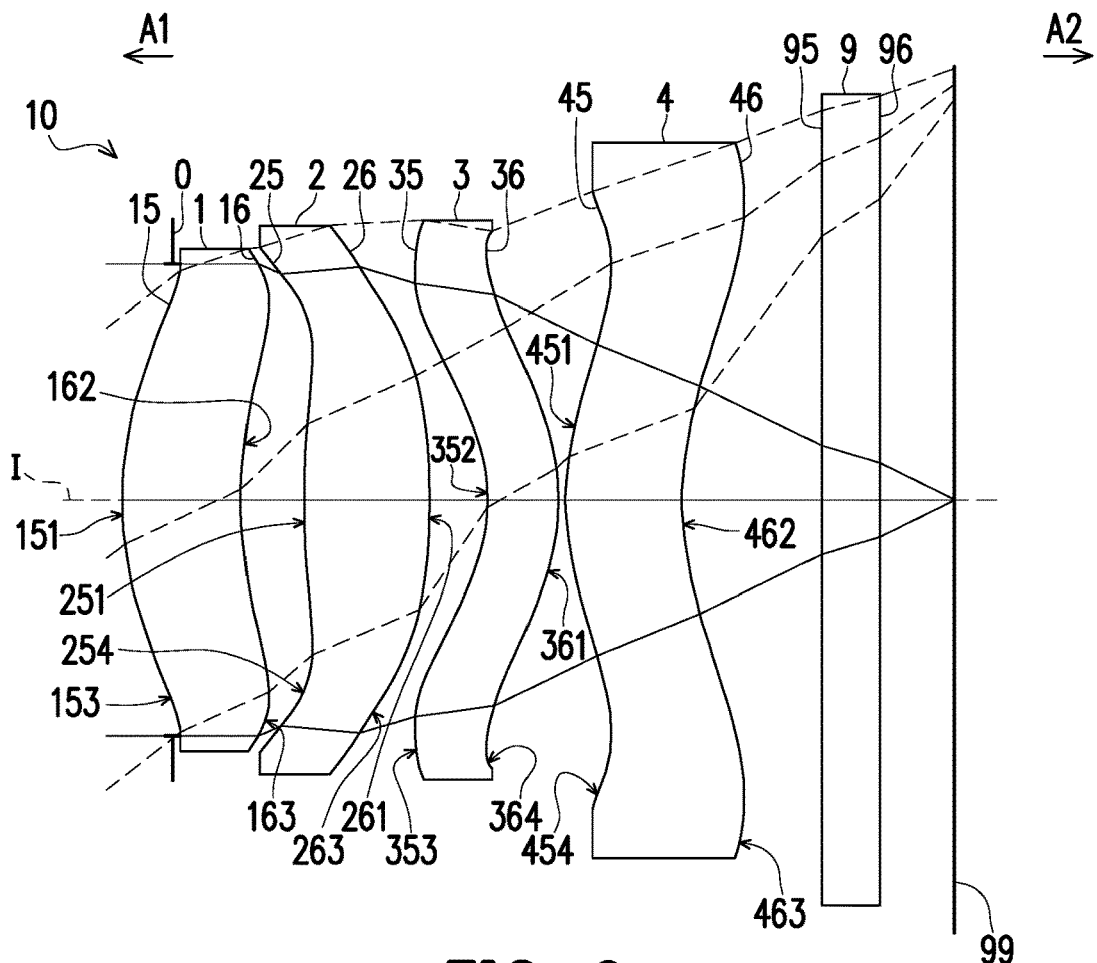
FIG. 6
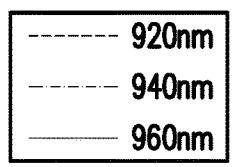
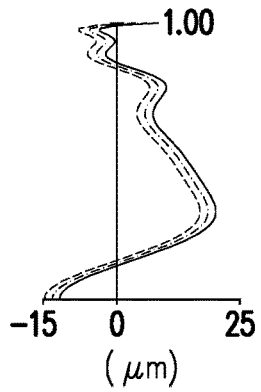
FIG. 7A
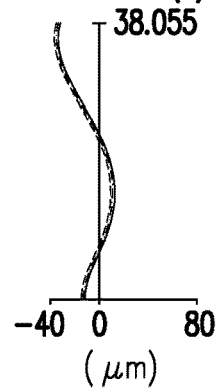
FIG. 7B
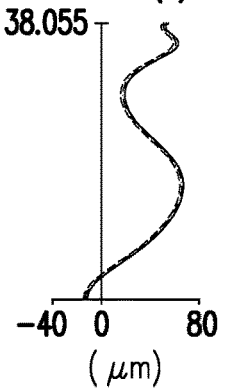
FIG. 7C
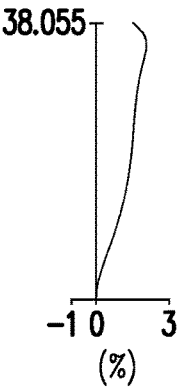
FIG. 7D

| First embodiment | | | | | | |
|---|---|---|---|---|---|---|
| EFL=1.874 mm, HFOV=38.047°, System length=2.975 mm, Fno=1.100, Image height=1.5 mm | | | | | | |
| Device | Surface | Radius (mm) | Distance (mm) | Refractive index | Abbe number | Focal length (mm) |
| Object | | | Infinite | | | |
| Aperture 0 | | Infinite | -0.194 | | | |
| First lens element 1 | Object-side surface 15 | 1.380 | 0.424 | 1.642 | 22.409 | 7.695 |
| | Image-side surface 16 | 1.714 | 0.225 | | | |
| Second lens element 2 | Object-side surface 25 | 2.919 | 0.450 | 1.642 | 22.409 | 2.199 |
| | Image-side surface 26 | -2.401 | 0.207 | | | |
| Third lens element 3 | Object-side surface 35 | -0.607 | 0.253 | 1.642 | 22.409 | -6.656 |
| | Image-side surface 36 | -0.825 | 0.025 | | | |
| Fourth lens element 4 | Object-side surface 45 | 0.933 | 0.417 | 1.642 | 22.409 | 5.087 |
| | Image-side surface 46 | 1.100 | 0.500 | | | |
| Filter 9 | Object-side surface 95 | Infinite | 0.210 | 1.517 | 64.167 | |
| | Image-side surface 96 | Infinite | 0.264 | | | |
| | Image plane 99 | Infinite | | | | |

FIG. 8

| Surface | K | $a_2$ | $a_4$ | $a_6$ | $a_8$ |
|---|---|---|---|---|---|
| 15 | 0.000000E+00 | 0.000000E+00 | 6.862610E-03 | -4.909673E-01 | 1.625508E+00 |
| 16 | 0.000000E+00 | 0.000000E+00 | -7.101991E-02 | -8.772157E-02 | -3.386744E-01 |
| 25 | 0.000000E+00 | 0.000000E+00 | -3.709738E-01 | 3.847623E+00 | -3.683311E+01 |
| 26 | 3.698326E-01 | 0.000000E+00 | 1.270363E-02 | -2.485124E+00 | 1.251892E+01 |
| 35 | -6.746600E+00 | 0.000000E+00 | -1.210958E+00 | 5.519500E+00 | -1.804580E+01 |
| 36 | -4.209584E+00 | 0.000000E+00 | -2.433717E-01 | -7.243024E-01 | 1.123210E+01 |
| 45 | -1.211561E+01 | 0.000000E+00 | 3.769039E-01 | -1.909437E+00 | 5.820844E+00 |
| 46 | -1.396635E+01 | 0.000000E+00 | 4.872136E-01 | -1.791515E+00 | 4.225144E+00 |
| Surface | $a_{10}$ | $a_{12}$ | $a_{14}$ | $a_{16}$ | $a_{18}$ |
| 15 | -3.611220E+00 | 3.733191E+00 | -1.444946E+00 | -2.281352E-01 | 0.000000E+00 |
| 16 | 2.995559E-01 | -2.271391E+00 | 3.764020E+00 | -1.682663E+00 | 0.000000E+00 |
| 25 | 1.875629E+02 | -5.787964E+02 | 1.064307E+03 | -1.135588E+03 | 6.503538E+02 |
| 26 | -3.707245E+01 | 5.953837E+01 | -4.090469E+01 | -5.064559E+00 | 2.096101E+01 |
| 35 | 4.565850E+01 | -7.571461E+01 | 8.420768E+01 | -6.540505E+01 | 3.256226E+01 |
| 36 | -5.031387E+01 | 1.366320E+02 | -2.342898E+02 | 2.448733E+02 | -1.422139E+02 |
| 45 | -1.351823E+01 | 2.109209E+01 | -2.100331E+01 | 1.252059E+01 | -3.973509E+00 |
| 46 | -7.461351E+00 | 9.190640E+00 | -7.481732E+00 | 3.794420E+00 | -1.079776E+00 |
| Surface | $a_{20}$ | | | | |
| 15 | 0.000000E+00 | | | | |
| 16 | 0.000000E+00 | | | | |
| 25 | -1.549373E+02 | | | | |
| 26 | -7.649551E+00 | | | | |
| 35 | -7.478591E+00 | | | | |
| 36 | 3.522595E+01 | | | | |
| 45 | 5.031113E-01 | | | | |
| 46 | 1.312954E-01 | | | | |

FIG. 9

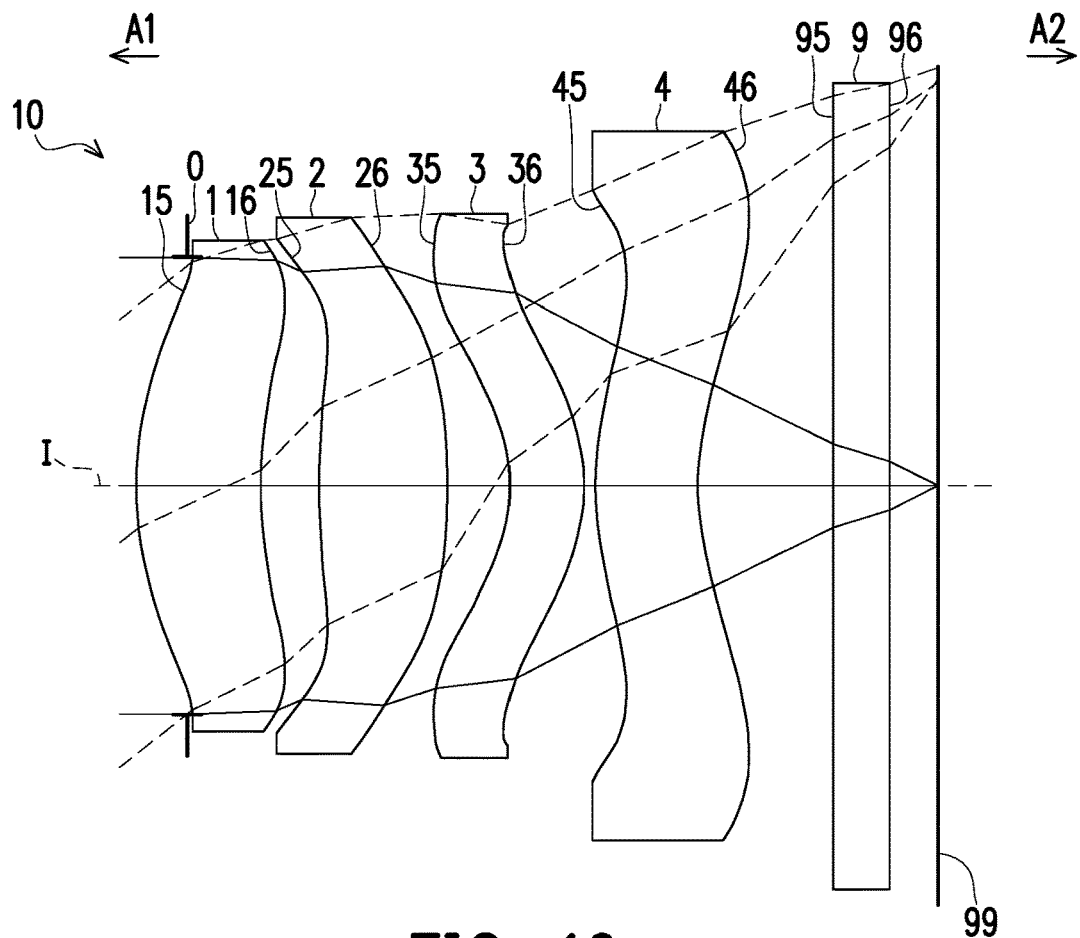
FIG. 10
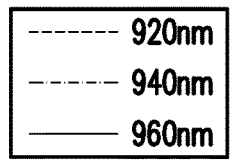
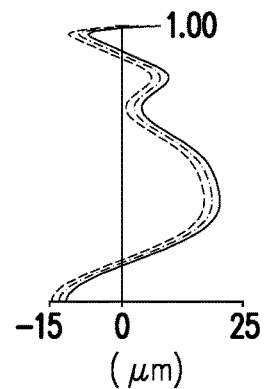
FIG. 11A
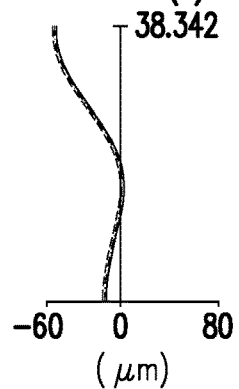
FIG. 11B
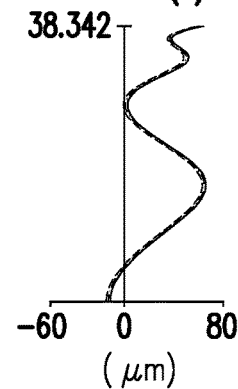
FIG. 11C
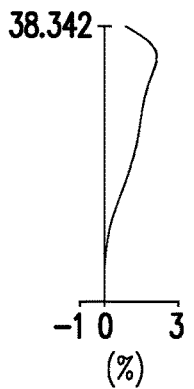
FIG. 11D

| Second embodiment ||||||
| --- | --- | --- | --- | --- | --- |
| EFL=1.867 mm ,HFOV=38.333° ,System length=2.965 mm, Fno=1.100, Image height=1.5 mm ||||||
| Device | Surface | Radius (mm) | Distance (mm) | Refractive index | Abbe number | Focal length (mm) |
| Object |  |  | Infinite |  |  |  |
| Aperture 0 |  | Infinite | -0.190 |  |  |  |
| First lens element 1 | Object-side surface 15 | 1.393 | 0.459 | 1.642 | 22.409 | 7.015 |
|  | Image-side surface 16 | 1.792 | 0.216 |  |  |  |
| Second lens element 2 | Object-side surface 25 | 2.802 | 0.477 | 1.642 | 22.409 | 2.042 |
|  | Image-side surface 26 | -2.154 | 0.228 |  |  |  |
| Third lens element 3 | Object-side surface 35 | -0.603 | 0.275 | 1.642 | 22.409 | 19.082 |
|  | Image-side surface 36 | -0.674 | 0.041 |  |  |  |
| Fourth lens element 4 | Object-side surface 45 | 1.214 | 0.380 | 1.642 | 22.409 | -21.792 |
|  | Image-side surface 46 | 0.981 | 0.500 |  |  |  |
| Filter 9 | Object-side surface 95 | Infinite | 0.210 | 1.517 | 64.167 |  |
|  | Image-side surface 96 | Infinite | 0.179 |  |  |  |
|  | Image plane 99 | Infinite |  |  |  |  |

FIG. 12

| Surface | K | $a_2$ | $a_4$ | $a_6$ | $a_8$ |
|---|---|---|---|---|---|
| 15 | 0.000000E+00 | 0.000000E+00 | -3.038364E-03 | -4.605393E-01 | 1.604982E+00 |
| 16 | 0.000000E+00 | 0.000000E+00 | -6.476832E-02 | -1.538750E-01 | -3.019450E-01 |
| 25 | 0.000000E+00 | 0.000000E+00 | -3.684306E-01 | 3.837309E+00 | -3.683075E+01 |
| 26 | -1.796465E+00 | 0.000000E+00 | 4.924174E-02 | -2.508401E+00 | 1.249890E+01 |
| 35 | -5.543988E+00 | 0.000000E+00 | -1.190854E+00 | 5.485177E+00 | -1.804942E+01 |
| 36 | -4.182110E+00 | 0.000000E+00 | -2.992990E-01 | -7.116542E-01 | 1.129506E+01 |
| 45 | -1.275528E+01 | 0.000000E+00 | 2.410040E-01 | -1.752761E+00 | 5.751707E+00 |
| 46 | -1.484521E+01 | 0.000000E+00 | 4.110487E-01 | -1.730100E+00 | 4.222689E+00 |

| Surface | $a_{10}$ | $a_{12}$ | $a_{14}$ | $a_{16}$ | $a_{18}$ |
|---|---|---|---|---|---|
| 15 | -3.614570E+00 | 3.751783E+00 | -1.422164E+00 | -2.343977E-01 | 0.000000E+00 |
| 16 | 3.535866E-01 | -2.233440E+00 | 3.762416E+00 | -1.744499E+00 | 0.000000E+00 |
| 25 | 1.875732E+02 | -5.787877E+02 | 1.064303E+03 | -1.135601E+03 | 6.503471E+02 |
| 26 | -3.708115E+01 | 5.954196E+01 | -4.089417E+01 | -5.055097E+00 | 2.096434E+01 |
| 35 | 4.567581E+01 | -7.570186E+01 | 8.421062E+01 | -6.540926E+01 | 3.255708E+01 |
| 36 | -5.030716E+01 | 1.366013E+02 | -2.343200E+02 | 2.448632E+02 | -1.422042E+02 |
| 45 | -1.355609E+01 | 2.109966E+01 | -2.099221E+01 | 1.252256E+01 | -3.973531E+00 |
| 46 | -7.481181E+00 | 9.193877E+00 | -7.481684E+00 | 3.795078E+00 | -1.078527E+00 |

| Surface | $a_{20}$ |
|---|---|
| 15 | 0.000000E+00 |
| 16 | 0.000000E+00 |
| 25 | -1.549149E+02 |
| 26 | -7.654993E+00 |
| 35 | -7.480406E+00 |
| 36 | 3.524583E+01 |
| 45 | 5.036911E-01 |
| 46 | 1.306047E-01 |

FIG. 13

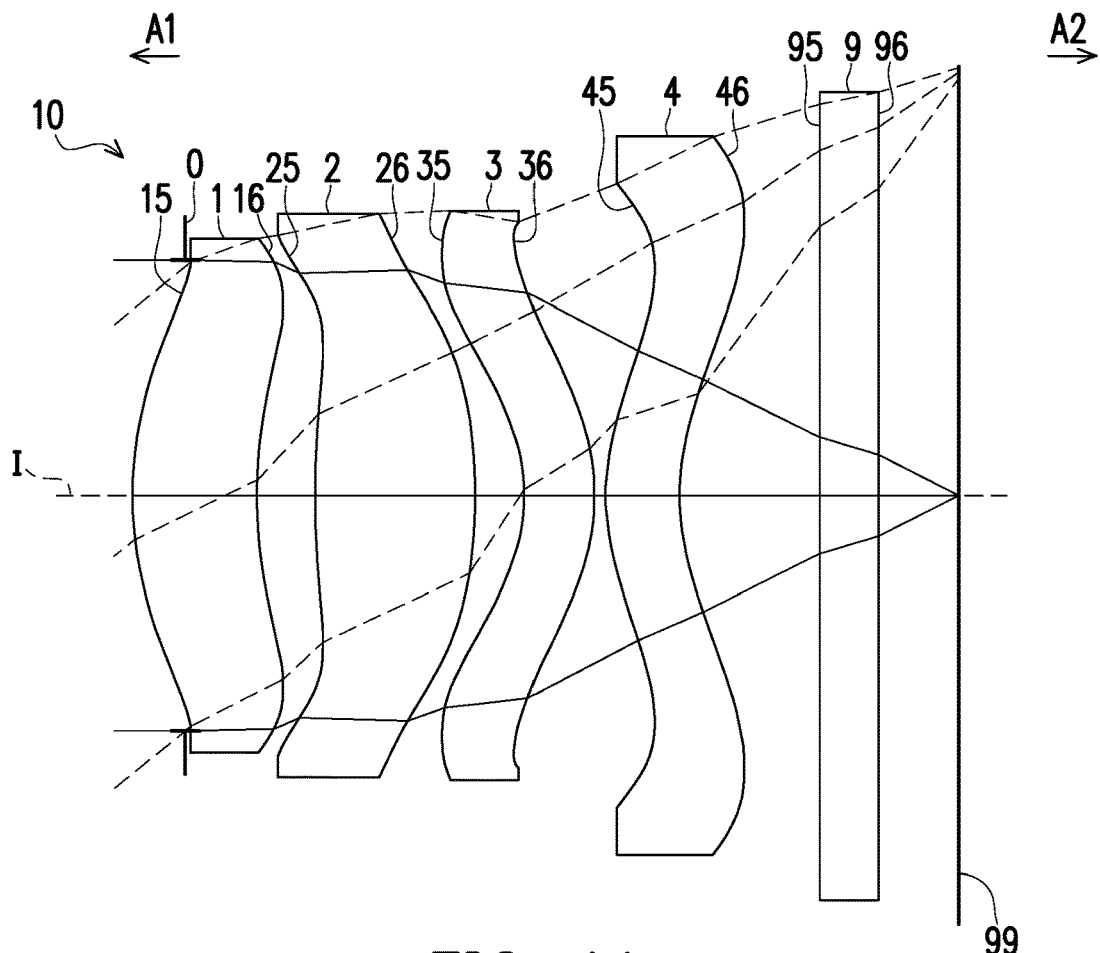
FIG. 14
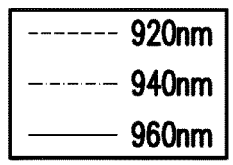
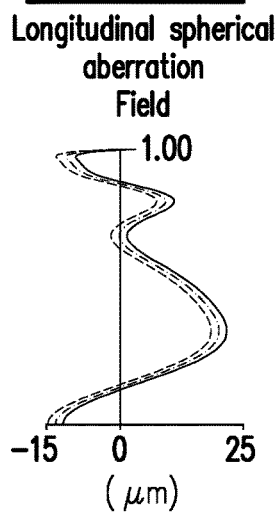
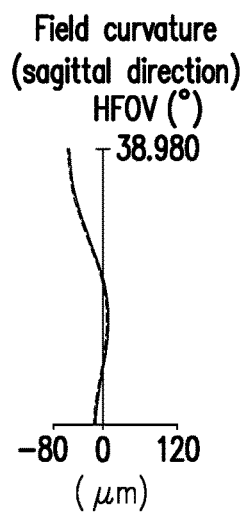
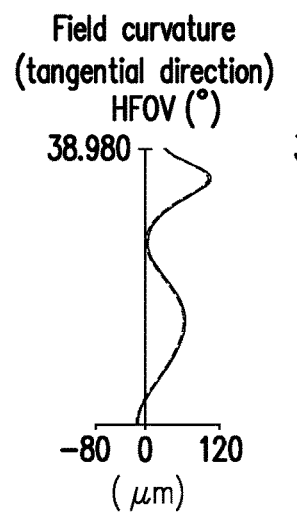
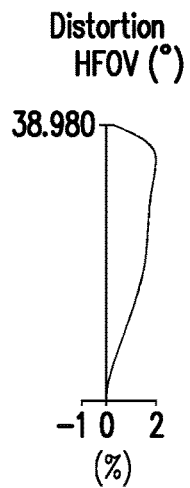
FIG. 15A   FIG. 15B   FIG. 15C   FIG. 15D

| Third embodiment | | | | | | |
|---|---|---|---|---|---|---|
| EFL=1.836 mm ,HFOV=38.976° ,System length=2.939 mm, Fno=1.100, Image height=1.5 mm | | | | | | |
| Device | Surface | Radius (mm) | Distance (mm) | Refractive index | Abbe number | Focal length (mm) |
| Object | | | Infinite | | | |
| Aperture 0 | | Infinite | -0.187 | | | |
| First lens element 1 | Object-side surface 15 | 1.368 | 0.441 | 1.642 | 22.409 | 7.372 |
| | Image-side surface 16 | 1.713 | 0.207 | | | |
| Second lens element 2 | Object-side surface 25 | 3.009 | 0.571 | 1.642 | 22.409 | 1.952 |
| | Image-side surface 26 | -1.872 | 0.174 | | | |
| Third lens element 3 | Object-side surface 35 | -0.605 | 0.249 | 1.642 | 22.409 | -9.644 |
| | Image-side surface 36 | -0.780 | 0.039 | | | |
| Fourth lens element 4 | Object-side surface 45 | 0.804 | 0.262 | 1.642 | 22.409 | 8.731 |
| | Image-side surface 46 | 0.827 | 0.500 | | | |
| Filter 9 | Object-side surface 95 | Infinite | 0.210 | 1.517 | 64.167 | |
| | Image-side surface 96 | Infinite | 0.285 | | | |
| | Image plane 99 | Infinite | | | | |

FIG. 16

| Surface | K | $a_2$ | $a_4$ | $a_6$ | $a_8$ |
|---|---|---|---|---|---|
| 15 | 0.000000E+00 | 0.000000E+00 | 1.469930E-02 | -5.023734E-01 | 1.592711E+00 |
| 16 | 0.000000E+00 | 0.000000E+00 | -5.081846E-02 | -1.780604E-01 | -4.010253E-01 |
| 25 | 0.000000E+00 | 0.000000E+00 | -3.600078E-01 | 3.855438E+00 | -3.685533E+01 |
| 26 | -6.721435E-01 | 0.000000E+00 | -1.497276E-02 | -2.378577E+00 | 1.254360E+01 |
| 35 | -5.482724E+00 | 0.000000E+00 | -1.231013E+00 | 5.463512E+00 | -1.799487E+01 |
| 36 | -3.394466E+00 | 0.000000E+00 | -2.397531E-01 | -6.760352E-01 | 1.121215E+01 |
| 45 | -6.857010E+00 | 0.000000E+00 | 2.462166E-01 | -1.798091E+00 | 5.754260E+00 |
| 46 | -6.878109E+00 | 0.000000E+00 | 3.820962E-01 | -1.756931E+00 | 4.228051E+00 |

| Surface | $a_{10}$ | $a_{12}$ | $a_{14}$ | $a_{16}$ | $a_{18}$ |
|---|---|---|---|---|---|
| 15 | -3.583582E+00 | 3.803958E+00 | -1.412218E+00 | -4.099782E-01 | 0.000000E+00 |
| 16 | 3.669948E-01 | -2.165424E+00 | 3.801155E+00 | -1.769626E+00 | 0.000000E+00 |
| 25 | 1.875845E+02 | -5.787358E+02 | 1.064369E+03 | -1.135558E+03 | 6.503256E+02 |
| 26 | -3.708581E+01 | 5.952631E+01 | -4.090589E+01 | -5.062617E+00 | 2.096162E+01 |
| 35 | 4.571101E+01 | -7.570286E+01 | 8.419064E+01 | -6.542580E+01 | 3.255107E+01 |
| 36 | -5.040598E+01 | 1.366093E+02 | -2.342281E+02 | 2.449536E+02 | -1.421863E+02 |
| 45 | -1.353670E+01 | 2.110531E+01 | -2.099681E+01 | 1.251481E+01 | -3.976506E+00 |
| 46 | -7.466940E+00 | 9.186304E+00 | -7.484089E+00 | 3.796324E+00 | -1.077818E+00 |

| Surface | $a_{20}$ |
|---|---|
| 15 | 0.000000E+00 |
| 16 | 0.000000E+00 |
| 25 | -1.550065E+02 |
| 26 | -7.653005E+00 |
| 35 | -7.471400E+00 |
| 36 | 3.514361E+01 |
| 45 | 5.071117E-01 |
| 46 | 1.303152E-01 |

FIG. 17

| Fourth embodiment | | | | | | |
|---|---|---|---|---|---|---|
| EFL=1.882 mm ,HFOV=37.740° ,System length=2.947 mm, Fno=1.100, Image height=1.5 mm | | | | | | |
| Device | Surface | Radius (mm) | Distance (mm) | Refractive index | Abbe number | Focal length (mm) |
| Object | | | Infinite | | | |
| Aperture 0 | | Infinite | -0.187 | | | |
| First lens element 1 | Object-side surface 15 | 1.396 | 0.505 | 1.642 | 22.409 | 6.060 |
| | Image-side surface 16 | 1.915 | 0.243 | | | |
| Second lens element 2 | Object-side surface 25 | 2.530 | 0.330 | 1.642 | 22.409 | 2.285 |
| | Image-side surface 26 | -3.048 | 0.232 | | | |
| Third lens element 3 | Object-side surface 35 | -0.730 | 0.366 | 1.642 | 22.409 | -20.309 |
| | Image-side surface 36 | -0.924 | 0.011 | | | |
| Fourth lens element 4 | Object-side surface 45 | 0.819 | 0.277 | 1.642 | 22.409 | 8.785 |
| | Image-side surface 46 | 0.839 | 0.500 | | | |
| Filter 9 | Object-side surface 95 | Infinite | 0.210 | 1.517 | 64.167 | |
| | Image-side surface 96 | Infinite | 0.274 | | | |
| | Image plane 99 | Infinite | | | | |

FIG. 20

| Surface | K | $a_2$ | $a_4$ | $a_6$ | $a_8$ |
|---|---|---|---|---|---|
| 15 | 0.000000E+00 | 0.000000E+00 | -8.999814E-03 | -4.067368E-01 | 1.577014E+00 |
| 16 | 0.000000E+00 | 0.000000E+00 | -8.055890E-02 | -4.667187E-02 | -3.011898E-01 |
| 25 | 0.000000E+00 | 0.000000E+00 | -3.904491E-01 | 3.857958E+00 | -3.691562E+01 |
| 26 | -1.580093E+01 | 0.000000E+00 | 3.949542E-02 | -2.566434E+00 | 1.248063E+01 |
| 35 | -9.626392E+00 | 0.000000E+00 | -1.178609E+00 | 5.474985E+00 | -1.805728E+01 |
| 36 | -4.607885E+00 | 0.000000E+00 | -2.823929E-01 | -7.624690E-01 | 1.124308E+01 |
| 45 | -7.605679E+00 | 0.000000E+00 | 3.112874E-01 | -1.828574E+00 | 5.743127E+00 |
| 46 | -9.321712E+00 | 0.000000E+00 | 4.601946E-01 | -1.836922E+00 | 4.236982E+00 |
| Surface | $a_{10}$ | $a_{12}$ | $a_{14}$ | $a_{16}$ | $a_{18}$ |
| 15 | -3.623796E+00 | 3.809886E+00 | -1.354658E+00 | -2.890454E-01 | 0.000000E+00 |
| 16 | 3.430065E-01 | -2.230567E+00 | 3.747261E+00 | -1.825283E+00 | 0.000000E+00 |
| 25 | 1.874994E+02 | -5.788006E+02 | 1.064350E+03 | -1.135532E+03 | 6.503774E+02 |
| 26 | -3.708446E+01 | 5.952912E+01 | -4.091678E+01 | -5.069915E+00 | 2.097819E+01 |
| 35 | 4.565749E+01 | -7.572007E+01 | 8.420095E+01 | -6.540797E+01 | 3.256637E+01 |
| 36 | -5.029424E+01 | 1.366642E+02 | -2.342543E+02 | 2.448932E+02 | -1.422322E+02 |
| 45 | -1.352057E+01 | 2.111112E+01 | -2.100154E+01 | 1.251045E+01 | -3.977789E+00 |
| 46 | -7.452431E+00 | 9.185184E+00 | -7.486314E+00 | 3.795563E+00 | -1.077561E+00 |
| Surface | $a_{20}$ | | | | |
| 15 | 0.000000E+00 | | | | |
| 16 | 0.000000E+00 | | | | |
| 25 | -1.549984E+02 | | | | |
| 26 | -7.594958E+00 | | | | |
| 35 | -7.467626E+00 | | | | |
| 36 | 3.514940E+01 | | | | |
| 45 | 5.096933E-01 | | | | |
| 46 | 1.305808E-01 | | | | |

FIG. 21

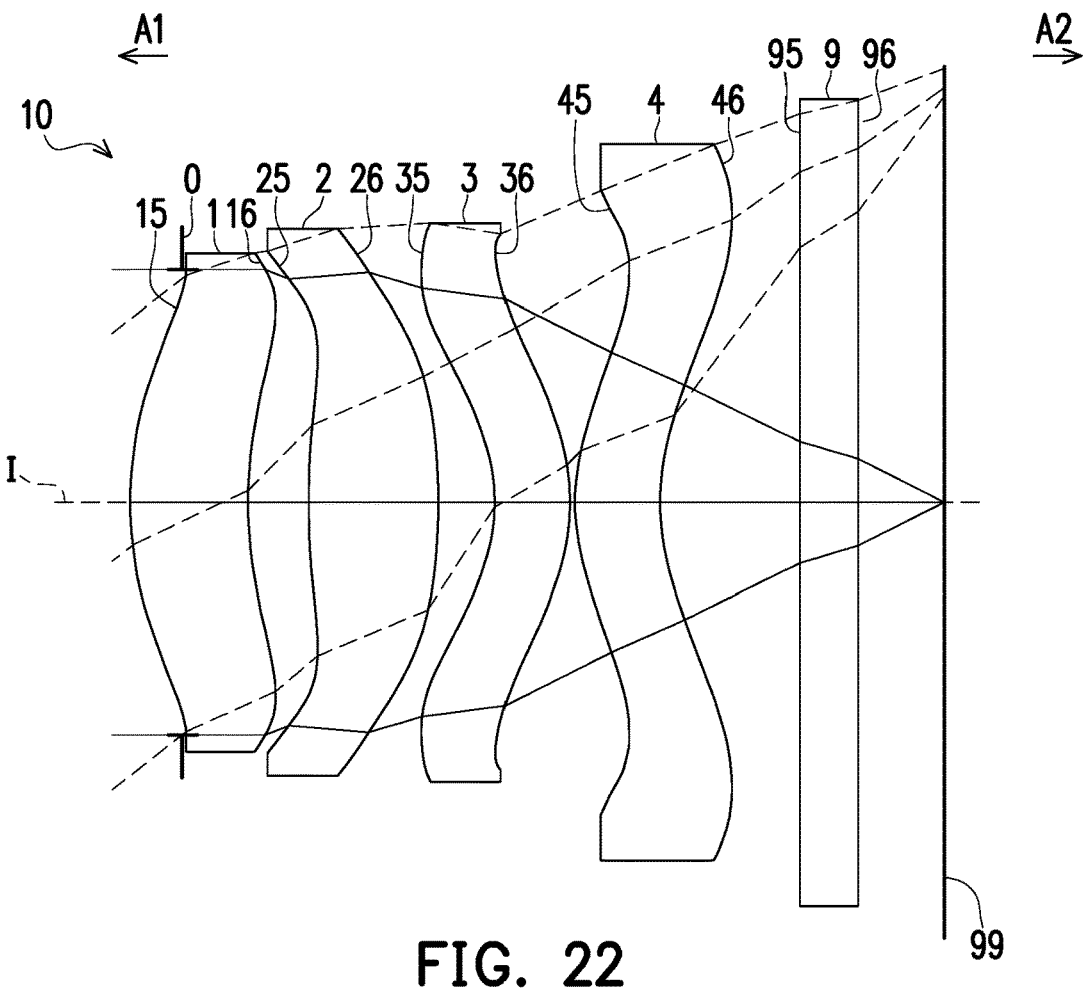
FIG. 22
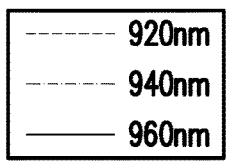
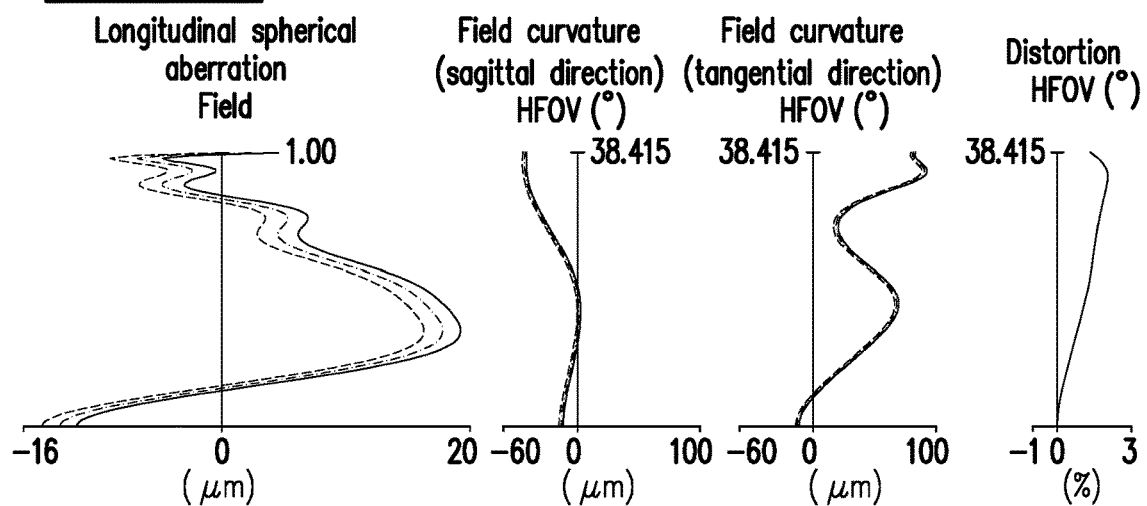
FIG. 23A  FIG. 23B  FIG. 23C  FIG. 23D

| Fifth embodiment | | | | | | |
|---|---|---|---|---|---|---|
| EFL=1.853 mm, HFOV=38.403°, System length=2.924 mm, Fno=1.100, Image height=1.5 mm | | | | | | |
| Device | Surface | Radius (mm) | Distance (mm) | Refractive index | Abbe number | Focal length (mm) |
| Object | | | Infinite | | | |
| Aperture 0 | | Infinite | -0.187 | | | |
| First lens element 1 | Object-side surface 15 | 1.362 | 0.422 | 1.642 | 22.409 | 8.456 |
| | Image-side surface 16 | 1.623 | 0.219 | | | |
| Second lens element 2 | Object-side surface 25 | 2.685 | 0.466 | 1.642 | 22.409 | 2.044 |
| | Image-side surface 26 | -2.234 | 0.203 | | | |
| Third lens element 3 | Object-side surface 35 | -0.611 | 0.269 | 1.642 | 22.409 | -10.751 |
| | Image-side surface 36 | -0.787 | 0.018 | | | |
| Fourth lens element 4 | Object-side surface 45 | 0.788 | 0.306 | 1.545 | 55.987 | 7.278 |
| | Image-side surface 46 | 0.854 | 0.500 | | | |
| Filter 9 | Object-side surface 95 | Infinite | 0.210 | 1.517 | 64.167 | |
| | Image-side surface 96 | Infinite | 0.311 | | | |
| | Image plane 99 | Infinite | | | | |

FIG. 24

| Surface | K | $a_2$ | $a_4$ | $a_6$ | $a_8$ |
|---|---|---|---|---|---|
| 15 | 0.000000E+00 | 0.000000E+00 | -2.733598E-02 | -4.388961E-01 | 1.556637E+00 |
| 16 | 0.000000E+00 | 0.000000E+00 | -1.114734E-01 | -8.696530E-02 | -3.466766E-01 |
| 25 | 0.000000E+00 | 0.000000E+00 | -3.913464E-01 | 3.862957E+00 | -3.685595E+01 |
| 26 | 2.142497E-01 | 0.000000E+00 | 1.544132E-02 | -2.466608E+00 | 1.251745E+01 |
| 35 | -6.671596E+00 | 0.000000E+00 | -1.207796E+00 | 5.488152E+00 | -1.803264E+01 |
| 36 | -4.389302E+00 | 0.000000E+00 | -2.615228E-01 | -7.313248E-01 | 1.124667E+01 |
| 45 | -6.904626E+00 | 0.000000E+00 | 3.267344E-01 | -1.857342E+00 | 5.743897E+00 |
| 46 | -7.940545E+00 | 0.000000E+00 | 4.802339E-01 | -1.834510E+00 | 4.237604E+00 |
| Surface | $a_{10}$ | $a_{12}$ | $a_{14}$ | $a_{16}$ | $a_{18}$ |
| 15 | -3.632259E+00 | 3.802351E+00 | -1.379420E+00 | -3.475667E-01 | 0.000000E+00 |
| 16 | 3.031279E-01 | -2.246729E+00 | 3.781959E+00 | -1.708149E+00 | 0.000000E+00 |
| 25 | 1.875657E+02 | -5.787723E+02 | 1.064328E+03 | -1.135584E+03 | 6.503403E+02 |
| 26 | -3.708240E+01 | 5.953499E+01 | -4.090121E+01 | -5.059906E+00 | 2.096209E+01 |
| 35 | 4.567738E+01 | -7.570909E+01 | 8.420345E+01 | -6.541195E+01 | 3.255854E+01 |
| 36 | -5.031799E+01 | 1.366312E+02 | -2.342818E+02 | 2.448833E+02 | -1.422136E+02 |
| 45 | -1.351740E+01 | 2.111729E+01 | -2.099624E+01 | 1.251285E+01 | -3.978404E+00 |
| 46 | -7.448321E+00 | 9.186172E+00 | -7.486488E+00 | 3.795139E+00 | -1.077787E+00 |
| Surface | $a_{20}$ | | | | |
| 15 | 0.000000E+00 | | | | |
| 16 | 0.000000E+00 | | | | |
| 25 | -1.549618E+02 | | | | |
| 26 | -7.654878E+00 | | | | |
| 35 | -7.476719E+00 | | | | |
| 36 | 3.521045E+01 | | | | |
| 45 | 5.066810E-01 | | | | |
| 46 | 1.306118E-01 | | | | |

FIG. 25

| Sixth embodiment | | | | | | |
|---|---|---|---|---|---|---|
| EFL=1.846 mm ,HFOV=38.434° ,System length=2.895 mm, Fno=1.150, Image height=1.5 mm | | | | | | |
| Device | Surface | Radius (mm) | Distance (mm) | Refractive index | Abbe number | Focal length (mm) |
| Object | | | Infinite | | | |
| Aperture 0 | | Infinite | -0.173 | | | |
| First lens element 1 | Object-side surface 15 | 1.292 | 0.339 | 1.642 | 22.409 | 7.670 |
| | Image-side surface 16 | 1.598 | 0.262 | | | |
| Second lens element 2 | Object-side surface 25 | 2.698 | 0.467 | 1.642 | 22.409 | 2.058 |
| | Image-side surface 26 | -2.254 | 0.214 | | | |
| Third lens element 3 | Object-side surface 35 | -0.609 | 0.230 | 1.642 | 22.409 | -7.843 |
| | Image-side surface 36 | -0.797 | 0.072 | | | |
| Fourth lens element 4 | Object-side surface 45 | 0.987 | 0.390 | 1.642 | 22.409 | 7.240 |
| | Image-side surface 46 | 1.074 | 0.500 | | | |
| Filter 9 | Object-side surface 95 | Infinite | 0.210 | 1.517 | 64.167 | |
| | Image-side surface 96 | Infinite | 0.211 | | | |
| | Image plane 99 | Infinite | | | | |

FIG. 28

| Surface | K | $a_2$ | $a_4$ | $a_6$ | $a_8$ |
|---|---|---|---|---|---|
| 15 | 0.000000E+00 | 0.000000E+00 | −2.681954E−02 | −4.876756E−01 | 1.549903E+00 |
| 16 | 0.000000E+00 | 0.000000E+00 | −8.699338E−02 | −1.431849E−01 | −3.372896E−01 |
| 25 | 0.000000E+00 | 0.000000E+00 | −3.739555E−01 | 3.886945E+00 | −3.683994E+01 |
| 26 | 4.469395E−01 | 0.000000E+00 | 3.392291E−02 | −2.495179E+00 | 1.250742E+01 |
| 35 | −5.763612E+00 | 0.000000E+00 | −1.205066E+00 | 5.519171E+00 | −1.803000E+01 |
| 36 | −3.765418E+00 | 0.000000E+00 | −2.333936E−01 | −7.009671E−01 | 1.124009E+01 |
| 45 | −1.034004E+01 | 0.000000E+00 | 3.251432E−01 | −1.839321E+00 | 5.737622E+00 |
| 46 | −1.219581E+01 | 0.000000E+00 | 4.891205E−01 | −1.810751E+00 | 4.224578E+00 |
| Surface | $a_{10}$ | $a_{12}$ | $a_{14}$ | $a_{16}$ | $a_{18}$ |
| 15 | −3.650050E+00 | 3.753821E+00 | −1.427485E+00 | −3.256290E−01 | 0.000000E+00 |
| 16 | 3.448186E−01 | −2.218756E+00 | 3.773886E+00 | −1.751419E+00 | 0.000000E+00 |
| 25 | 1.875686E+02 | −5.787768E+02 | 1.064321E+03 | −1.135591E+03 | 6.503319E+02 |
| 26 | −3.708357E+01 | 5.953596E+01 | −4.090055E+01 | −5.060421E+00 | 2.095992E+01 |
| 35 | 4.566668E+01 | −7.572104E+01 | 8.419607E+01 | −6.541423E+01 | 3.256123E+01 |
| 36 | −5.033504E+01 | 1.366120E+02 | −2.342960E+02 | 2.448781E+02 | −1.422075E+02 |
| 45 | −1.353090E+01 | 2.111627E+01 | −2.099116E+01 | 1.251672E+01 | −3.977513E+00 |
| 46 | −7.447283E+00 | 9.188090E+00 | −7.486439E+00 | 3.794855E+00 | −1.078035E+00 |
| Surface | $a_{20}$ | | | | |
| 15 | 0.000000E+00 | | | | |
| 16 | 0.000000E+00 | | | | |
| 25 | −1.549703E+02 | | | | |
| 26 | −7.658313E+00 | | | | |
| 35 | −7.468145E+00 | | | | |
| 36 | 3.522957E+01 | | | | |
| 45 | 5.049315E−01 | | | | |
| 46 | 1.307343E−01 | | | | |

FIG. 29

| Condition | First embodiment | Second embodiment | Third embodiment | Fourth embodiment | Fifth embodiment | Sixth embodiment |
|---|---|---|---|---|---|---|
| T1 | 0.424 | 0.459 | 0.441 | 0.505 | 0.422 | 0.339 |
| G12 | 0.225 | 0.216 | 0.207 | 0.243 | 0.219 | 0.262 |
| T2 | 0.450 | 0.477 | 0.571 | 0.330 | 0.466 | 0.467 |
| G23 | 0.207 | 0.228 | 0.174 | 0.232 | 0.203 | 0.214 |
| T3 | 0.253 | 0.275 | 0.249 | 0.366 | 0.269 | 0.230 |
| G34 | 0.025 | 0.041 | 0.039 | 0.011 | 0.018 | 0.072 |
| T4 | 0.417 | 0.380 | 0.262 | 0.277 | 0.306 | 0.390 |
| G4F | 0.500 | 0.500 | 0.500 | 0.500 | 0.500 | 0.500 |
| TF | 0.210 | 0.210 | 0.210 | 0.210 | 0.210 | 0.210 |
| GFP | 0.264 | 0.179 | 0.285 | 0.274 | 0.311 | 0.211 |
| V1 | 22.409 | 22.409 | 22.409 | 22.409 | 22.409 | 22.409 |
| V2 | 22.409 | 22.409 | 22.409 | 22.409 | 22.409 | 22.409 |
| V3 | 22.409 | 22.409 | 22.409 | 22.409 | 22.409 | 22.409 |
| V4 | 22.409 | 22.409 | 22.409 | 22.409 | 55.987 | 22.409 |
| ALT | 1.544 | 1.591 | 1.523 | 1.478 | 1.464 | 1.427 |
| TL | 2.002 | 2.076 | 1.944 | 1.963 | 1.903 | 1.974 |
| AAG | 0.458 | 0.485 | 0.420 | 0.485 | 0.439 | 0.548 |
| EFL | 1.874 | 1.867 | 1.836 | 1.882 | 1.853 | 1.846 |
| BFL | 0.974 | 0.889 | 0.995 | 0.984 | 1.021 | 0.921 |
| TTL | 2.975 | 2.965 | 2.939 | 2.947 | 2.924 | 2.895 |
| Tmin | 0.253 | 0.275 | 0.249 | 0.277 | 0.269 | 0.230 |
| Tmax | 0.450 | 0.477 | 0.571 | 0.505 | 0.466 | 0.467 |

FIG. 30

| Condition | First embodiment | Second embodiment | Third embodiment | Fourth embodiment | Fifth embodiment | Sixth embodiment |
|---|---|---|---|---|---|---|
| T2/T3 | 1.778 | 1.736 | 2.289 | 0.900 | 1.733 | 2.035 |
| (G23+G34)/G12 | 1.031 | 1.249 | 1.026 | 1.000 | 1.008 | 1.092 |
| EFL/T4 | 4.491 | 4.914 | 7.004 | 6.785 | 6.054 | 4.727 |
| (T4+AAG)/T1 | 2.062 | 1.884 | 1.548 | 1.512 | 1.766 | 2.767 |
| V1+V2+V4 | 67.227 | 67.227 | 67.227 | 67.227 | 100.805 | 67.227 |
| (T1+T2)/(T3+T4) | 1.304 | 1.430 | 1.978 | 1.296 | 1.544 | 1.301 |
| (T2+T4)/(T3+G12) | 1.812 | 1.747 | 1.824 | 0.997 | 1.584 | 1.746 |
| (T2+T4)/AAG | 1.893 | 1.766 | 1.982 | 1.251 | 1.760 | 1.566 |
| (T3+AAG)/T4 | 1.704 | 2.001 | 2.555 | 3.071 | 2.313 | 1.991 |
| ALT/(G12+G23) | 3.567 | 3.582 | 3.990 | 3.112 | 3.475 | 3.001 |
| ALT/AAG | 3.372 | 3.278 | 3.624 | 3.045 | 3.334 | 2.605 |
| ALT/(G12+G34) | 6.166 | 6.190 | 6.191 | 5.834 | 6.190 | 4.270 |
| EFL/AAG | 4.092 | 3.847 | 4.368 | 3.877 | 4.222 | 3.370 |
| ALT/BFL | 1.586 | 1.790 | 1.530 | 1.502 | 1.433 | 1.550 |
| (ALT+EFL)/AAG | 7.465 | 7.125 | 7.992 | 6.921 | 7.556 | 5.975 |
| (T1+T2+AAG)/T4 | 3.192 | 3.742 | 5.463 | 4.758 | 4.336 | 3.468 |
| TL/BFL | 2.056 | 2.335 | 1.953 | 1.996 | 1.863 | 2.145 |
| BFL/(T3+T4) | 1.453 | 1.358 | 1.946 | 1.528 | 1.775 | 1.485 |
| (AAG+EFL)/(T3+G34) | 8.389 | 7.445 | 7.836 | 6.282 | 7.988 | 7.927 |
| (AAG+T2)/T1 | 2.139 | 2.096 | 2.248 | 1.615 | 2.146 | 2.994 |

FIG. 31

OPTICAL IMAGING LENS

CROSS REFERENCE TO RELATED APPLICATION

This application claims the priority benefit of China application serial no. 201811625438.3, filed on Dec. 28, 2018. The entirety of the above-mentioned patent application is hereby incorporated by reference herein and made a part of specification.

TECHNICAL FIELD

The disclosure relates to an optical device, and more particularly to an optical imaging lens.

DESCRIPTION OF RELATED ART

As consumer electronics are changing every day, the requirement for compactness and slimness has not slowed down. Therefore, the crucial components of electronic products such as optical lens elements must be continuously improved in order to meet the needs of consumers. In addition to imaging quality and volume, the most important features of optical lenses also include the requirement for expanding the field of view (FOV). Therefore, in the field of designing optical lenses, the lenses are not only required to be slim but also required to have good imaging quality and performance.

However, the optical imaging lens design is not to simply scale down the lens with good imaging quality to form the optical imaging lens characterized by both good imaging quality and miniaturization. The design process involves not only the material properties but also the practical production issues, such as manufacture, assembly yield, and so on. Therefore, how to manufacture the optical imaging lens with good imaging quality in consideration of the above factors has been a topic constantly discussed in the industry.

Besides, in recent years, the optical imaging lenses have evolved to be widely applied. In addition to the requirement for compactness and slimness of the lenses, the requirement for small f-number (Fno) also contributes to an enhancement of luminous flux. Hence, how to design an optical imaging lens characterized by compactness, slimness, small Fno, and good imaging quality has always been the development goal.

SUMMARY

The disclosure provides an optical imaging lens with small size, small f-number (Fno), and good imaging quality. The optical imaging lens is mainly configured to shoot images and record videos through, for instance, mobile phones, cameras, tablet PCs, personal digital assistants (PDAs), and so on, and the optical imaging lens can also be applied to three-dimensional (3D) image detection.

In an embodiment of the disclosure, an optical imaging lens including a first lens element, a second lens element, a third lens element, and a fourth lens element arranged in sequence from an object side to an image side along an optical axis is provided. Each of the first lens element to the fourth lens element includes an object-side surface facing the object side and allowing imaging rays to pass through and an image-side surface facing the image side and allowing the imaging rays to pass through. A periphery region of an image-side surface of the first lens element is convex, an optical axis region of an image-side surface of the second lens element is convex, and a periphery region of an object-side surface of the third lens element is convex. An optical axis region of an object-side surface of the fourth lens element is convex, and a periphery region of the object-side surface of the fourth lens element is concave. Lens elements having refracting power in the optical imaging lens are only the aforementioned four lens elements. The optical imaging lens satisfies: V3≤30.000 and T2/T3≥0.900, wherein V3 is an Abbe number of the third lens element, T2 is a thickness of the second lens element on the optical axis, and T3 is a thickness of the third lens element on the optical axis.

In view of the above, the optical imaging lens provided in one or more embodiments is advantageous because of the following: the optical imaging lens provided in one or more embodiments satisfies the number of the lens element having refracting power, the surface shape design of the lens elements, and said conditions, so that the optical imaging lens provided herein can have good imaging quality as well as small size and small Fno.

In order to make the aforementioned and other features and advantages comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

FIG. 6 is a schematic diagram illustrating an optical imaging lens according to a first embodiment of the disclosure.

FIG. 7A to FIG. 7D are diagrams illustrating a longitudinal spherical aberration and various aberrations of the optical imaging lens according to the first embodiment.

FIG. 8 shows detailed optical data of the optical imaging lens according to the first embodiment of the disclosure.

FIG. 9 shows aspheric parameters pertaining to the optical imaging lens according to the first embodiment of the disclosure.

FIG. 10 is a schematic diagram illustrating an optical imaging lens according to a second embodiment of the disclosure.

FIG. 11A to FIG. 11D are diagrams illustrating a longitudinal spherical aberration and various aberrations of the optical imaging lens according to the second embodiment.

FIG. 12 shows detailed optical data of the optical imaging lens according to the second embodiment of the disclosure.

FIG. 13 shows aspheric parameters pertaining to the optical imaging lens according to the second embodiment of the disclosure.

FIG. 14 is a schematic diagram illustrating an optical imaging lens according to a third embodiment of the disclosure.

FIG. 15A to FIG. 15D are diagrams illustrating a longitudinal spherical aberration and various aberrations of the optical imaging lens according to the third embodiment.

FIG. 16 shows detailed optical data of the optical imaging lens according to the third embodiment of the disclosure.

FIG. 17 shows aspheric parameters pertaining to the optical imaging lens according to the third embodiment of the disclosure.

FIG. 20 shows detailed optical data of the optical imaging lens according to the fourth embodiment of the disclosure.

FIG. 21 shows aspheric parameters pertaining to the optical imaging lens according to the fourth embodiment of the disclosure.

FIG. 22 is a schematic diagram illustrating an optical imaging lens according to a fifth embodiment of the disclosure.

FIG. 23A to FIG. 23D are diagrams illustrating a longitudinal spherical aberration and various aberrations of the optical imaging lens according to the fifth embodiment.

FIG. 24 shows detailed optical data of the optical imaging lens according to the fifth embodiment of the disclosure.

FIG. 25 shows aspheric parameters pertaining to the optical imaging lens according to the fifth embodiment of the disclosure.

FIG. 28 shows detailed optical data of the optical imaging lens according to the sixth embodiment of the disclosure.

FIG. 29 shows aspheric parameters pertaining to the optical imaging lens according to the sixth embodiment of the disclosure.

FIG. 30 and FIG. 31 show values of respective important parameters and relations of the optical imaging lens according to the first to sixth embodiments of the disclosure.

DESCRIPTION OF THE EMBODIMENTS

Figure 1:
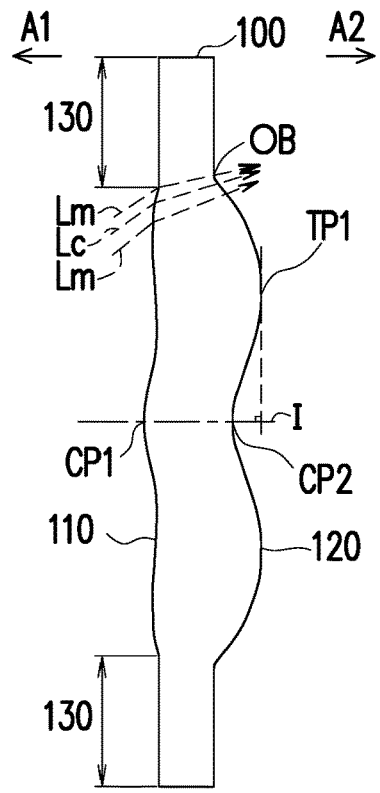
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
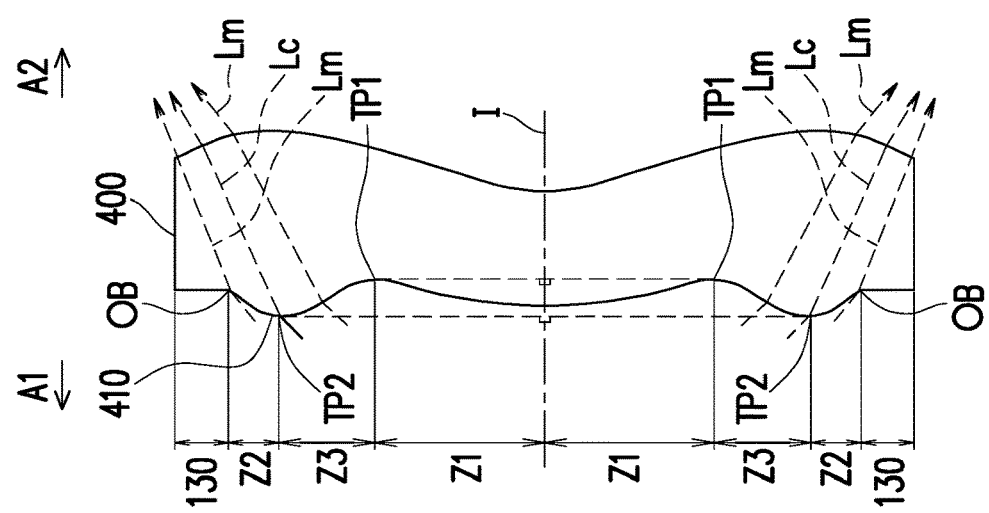
FIG. 4 is a schematic diagram illustrating a surface shape structure of a lens element according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest $N^{th}$ transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
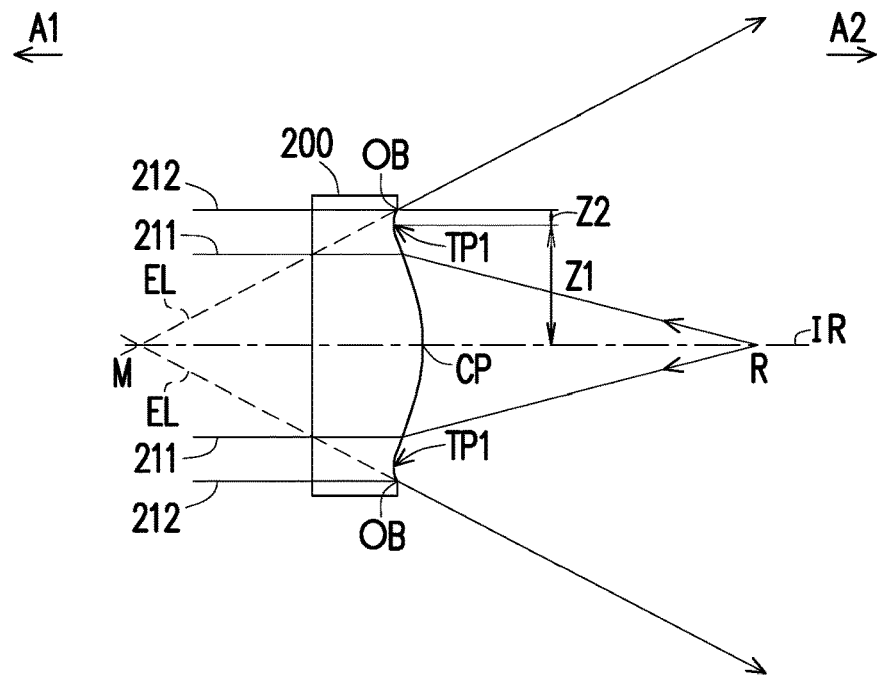
FIG. 2 is a schematic diagram illustrating concave and convex surface shape structures and a light focal point of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis Ion the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
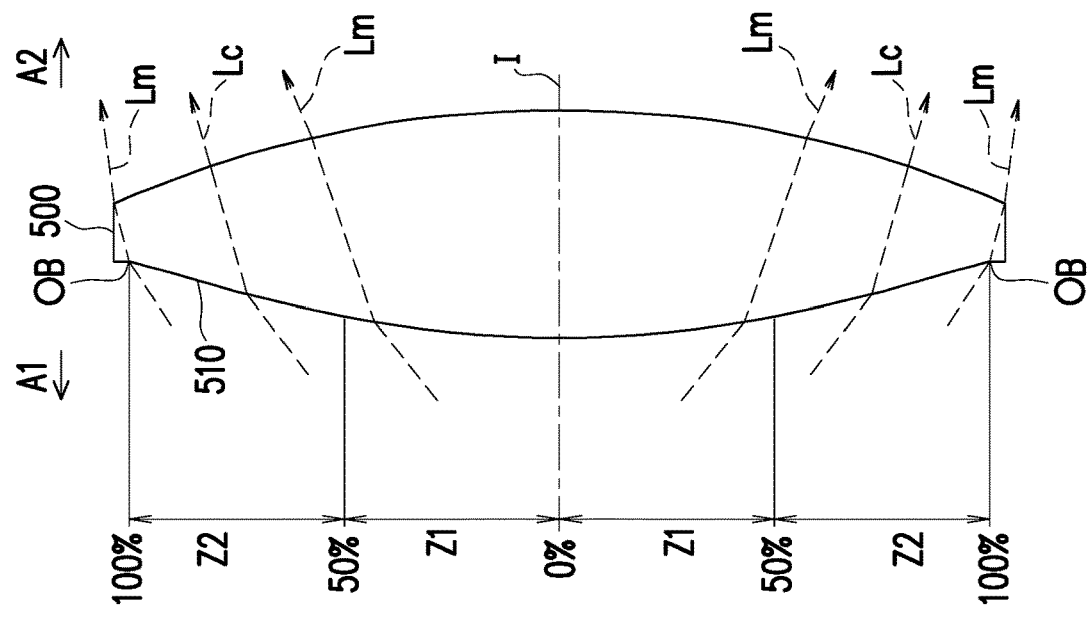
FIG. 5 is a schematic diagram illustrating a surface shape structure of a lens element according to Example 3.
Figure 3:
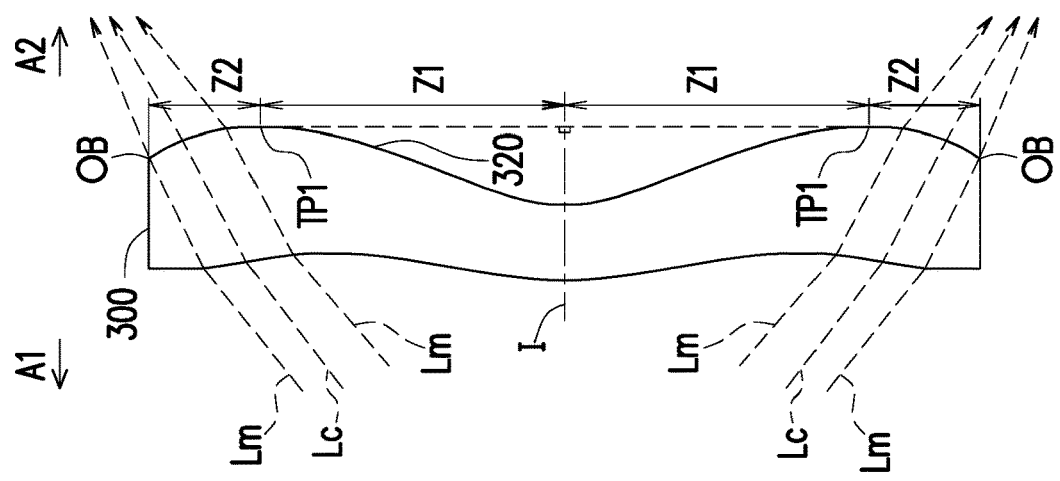
FIG. 3 is a schematic diagram illustrating a surface shape structure of a lens element according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the disclosure, and FIG. 7A to FIG. 7D are diagrams illustrating a longitudinal spherical aberration and various aberrations of the optical imaging lens according to the first embodiment. With reference to FIG. 6, the optical imaging lens 10 provided in the first embodiment of the disclosure includes an aperture 0, a first lens element 1, a second lens element 2, a third lens element 3, a fourth lens element 4, and a filter 9 arranged in sequence from the object side A1 to the image side A2 along an optical axis I of the optical imaging lens 10. When rays emitted from an object to be shot enter the optical imaging lens 10, an image may be formed on an image plane 99 after the rays sequentially pass through the aperture 0, the first lens element 1, the second lens element 2, the third lens element 3, the fourth lens element 4, and the filter 9. The filter 9 can only allow the rays with an appropriate wavelength (e.g., infrared rays or visible rays) to pass through and is arranged between the fourth lens element 4 and the image plane 99. In addition, the object side A1 is a side facing the object to be shot, whereas the image side A2 is a side facing the image plane 99.

In the present embodiment, the first lens element 1, the second lens element 2, the third lens element 3, the fourth lens element 4, and the filter 9 of the optical imaging lens 10 respectively have object-side surfaces 15, 25, 35, 45, and 95 facing the object side A1 and allowing imaging rays to pass through and image-side surfaces 16, 26, 36, 46, and 96 facing the image side A2 and allowing the imaging rays to pass through. In the present embodiment, the aperture 0 is arranged on the object side A1 of the first lens element 1.

The first lens element 1 has positive refracting power. The first lens element 1 is made of plastic. The optical axis region 151 of the object-side surface 15 of the first lens element 1 is convex, and the periphery region 153 thereof is convex. The optical axis region 162 of the image-side surface 16 of the first lens element 1 is concave, and the periphery region 163 thereof is convex. In the present embodiment, both the object-side surface 15 and the image-side surface 16 of the first lens element 1 are aspheric surfaces.

The second lens element 2 has positive refracting power. The second lens element 2 is made of plastic. The optical axis region 251 of the object-side surface 25 of the second lens element 2 is convex, and the periphery region 254 thereof is concave. The optical axis region 261 of the image-side surface 26 of the second lens element 2 is convex, and the periphery region 263 thereof is convex. In the present embodiment, both the object-side surface 25 and the image-side surface 26 of the second lens element 2 are aspheric surfaces.

The third lens element 3 has negative refracting power. The third lens element 3 is made of plastic. The optical axis region 352 of the object-side surface 35 of the third lens element 3 is concave, and the periphery region 353 thereof is convex. The optical axis region 361 of the image-side surface 36 of the third lens element 3 is convex, and the periphery region 364 thereof is concave. In the present embodiment, both the object-side surface 35 and the image-side surface 36 of the third lens element 3 are aspheric surfaces.

The fourth lens element 4 has positive refracting power. The fourth lens element 4 is made of plastic. The optical axis region 451 of the object-side surface 45 of the fourth lens element 4 is convex, and the periphery region 454 thereof is concave. The optical axis region 462 of the image-side surface 46 of the fourth lens element 4 is concave, and the periphery region 463 thereof is convex. In the present embodiment, both the object-side surface 45 and the image-side surface 46 of the fourth lens element 4 are aspheric surfaces.

Other detailed optical data provided in the first embodiment are as shown in FIG. 8. In addition, the effective focal length (EFL) of the optical imaging lens 10 provided in the first embodiment is 1.874 mm, the half field of view (HFOV) thereof is 38.047°, the system length thereof is 2.975 mm, the f-number (Fno) thereof is 1.100, and the image height thereof is 1.5 mm, wherein the system length is the distance from the object-side surface 15 of the first lens element 1 to the image plane 99 on the optical axis I.

Besides, in the present embodiment, the object-side surfaces 15, 25, 35, and 45 and the image-side surfaces 16, 26, 36, and 46 of the first lens element 1, the second lens element 2, the third lens element 3, and the fourth lens element 4 are all even aspheric surfaces defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \quad (1)$$

Y: a distance from a point on an aspheric curve to the optical axis;

Z: a depth of the aspheric surface, i.e., a vertical distance between a point on the aspheric surface that is spaced by the distance Y from the optical axis and a tangent plane tangent to a vertex of the aspheric surface on the optical axis;

R: a radius of curvature of the surface of the lens element;

K: a conic constant;

$a_{2i}$: the $2i^{th}$ order aspheric coefficient.

Respective aspheric coefficients of the object-side surface 15 of the first lens element 1 to the image-side surface 46 of the fourth lens element 4 in the formula (1) are as shown in FIG. 9. Here, the row number 15 in FIG. 9 represents aspheric coefficients of the object-side surface 15 of the first lens element 1, and other rows are arranged based on the same principle.

Besides, relations of important parameters in the optical imaging lens 10 according to the first embodiment are as shown in FIG. 30 and FIG. 31, and the unit of the respective parameters listed in the rows from T1 to GFP and from ALT to Tmax in FIG. 30 is millimeter (mm).

Here,

T1 is a thickness of the first lens element 1 on the optical axis I;

T2 is a thickness of the second lens element 2 on the optical axis I;

T3 is a thickness of the third lens element 3 on the optical axis I;

T4 is a thickness of the fourth lens element 4 on the optical axis I;

Tmin is the minimum thickness of the four lens thicknesses of the first lens element 1 to the fourth lens element 4 on the optical axis I;

Tmax is the maximum thickness of the four lens thicknesses of the first lens element 1 to the fourth lens element 4 on the optical axis I;

G12 is a distance from the image-side surface 16 of the first lens element 1 to the object-side surface 25 of the second lens element 2 on the optical axis I, i.e., an air gap from the first lens element 1 to the second lens element 2 on the optical axis I;

G23 is a distance from the image-side surface 26 of the second lens element 2 to the object-side surface 35 of the third lens element 3 on the optical axis I, i.e., an air gap from the second lens element 2 to the third lens element 3 on the optical axis I;

G34 is a distance from the image-side surface 36 of the third lens element 3 to the object-side surface 45 of the fourth lens element 4 on the optical axis I, i.e., an air gap from the third lens element 3 to the fourth lens element 4 on the optical axis I;

AAG is a sum of three air gaps from the first lens element 1 to the fourth lens element 4 on the optical axis I, i.e., the sum of G12, G23, and G34;

ALT is a sum of four lens thicknesses of the first lens element 1 to the fourth lens element 4 on the optical axis I, i.e., the sum of T1, T2, T3, and T4;

TL is a distance from the object-side surface 15 of the first lens element 1 to the image-side surface 46 of the fourth lens element 4 on the optical axis I;

TTL is a distance from the object-side surface 15 of the first lens element 1 to the image plane 99 on the optical axis I;

BFL is a distance from the image-side surface 46 of the fourth lens element 4 to the image plane 99 on the optical axis I;

ImgH is an image height of the optical imaging lens 10;

HFOV is the half field of view (HFOV) of the optical imaging lens 10;

EFL is a system focal length of the optical imaging lens 10, i.e., an effective focal length (EFL) of the overall optical imaging lens 10.

Besides, other definitions are provided below:

G4F is an air gap from the fourth lens element 4 to the filter 9 on the optical axis I;

TF is a thickness of the filter 9 on the optical axis I;

GFP is an air gap from the filter 9 to the image plane 99 on the optical axis I;

f1 is a focal length of the first lens element 1;
f2 is a focal length of the second lens element 2;
f3 is a focal length of the third lens element 3;
f4 is a focal length of the fourth lens element 4;
n1 is a refractive index of the first lens element 1;
n2 is a refractive index of the second lens element 2;
n3 is a refractive index of the third lens element 3;
n4 is a refractive index of the fourth lens element 4;
V1 is an Abbe number of the first lens element 1;
V2 is an Abbe number of the second lens element 2;
V3 is an Abbe number of the third lens element 3;
V4 is an Abbe number of the fourth lens element 4.

With reference to FIG. 7A to FIG. 7D, the longitudinal spherical aberration provided in the first embodiment is depicted in FIG. 7A, and FIG. 7B and FIG. 7C respectively illustrate the field curvature aberration in the sagittal direction and the field curvature aberration in the tangential direction on the image plane 99 of the first embodiment when the wavelength is 920 nm, 940 nm, and 960 nm, and FIG. 7D illustrates the distortion aberration on the image plane 99 of the first embodiment when the wavelength is 920 nm, 940 nm, and 960 nm. In FIG. 7A illustrating the longitudinal spherical aberration of the first embodiment, the curves representing the respective wavelengths are close to each other and approach the center, indicating that off-axis rays in different heights at the respective wavelengths are focused in a vicinity of the imaging point. Based on extents of deviation of the curves for the respective wavelengths, imaging point deviations of the off-axis rays in different heights are controlled within a range of ±21 micrometer (µm). Therefore, the spherical aberration of the same wavelength is reduced in the first embodiment, and the distances among the three representative wavelengths are also close, indicating that imaging positions of rays of different wavelengths are concentrated. Hence, chromatic aberration is also suppressed.

In FIG. 7B and FIG. 7C illustrating the field curvature aberration, the field curvature aberrations of the three representing wavelengths in the whole field range fall within ±70 µm, indicating that the optical system provided in the first embodiment is able to effectively reduce aberration. In FIG. 7D illustrating the distortion aberration, the distortion aberration provided in the first embodiment is maintained within a range of ±2.2%, indicating that the distortion aberration provided in the first embodiment satisfies an imaging quality requirement of the optical system. Hence, compared with the conventional optical imaging lenses, the optical imaging lens provided in the first embodiment is able to render good imaging quality on a condition that the system length is reduced to about 2.975 mm.

FIG. 10 is a schematic diagram illustrating an optical imaging lens according to a second embodiment of the disclosure, and FIG. 11A to FIG. 11D are diagrams illustrating a longitudinal spherical aberration and various aberrations of the optical imaging lens according to the second embodiment. With reference to FIG. 10, the second embodiment describing the optical imaging lens 10 is similar to the first embodiment, while the difference therebetween lies in the optical data, the aspheric coefficients, and the parameters of the lens elements 1, 2, 3, and 4. Besides, in the second embodiment, the third lens element 3 has positive refracting power, and the fourth lens element 4 has negative refracting power. However, in the second embodiment, each of the first lens element 1 and the second lens element 2 has positive refracting power, which is the same as that of each of the first lens element 1 and the second lens element 2 provided in the first embodiment has positive refracting power. To clearly illustrate the drawing, some reference numerals indicating the optical axis regions and the periphery regions similar to those in the first embodiment are omitted in FIG. 10.

Detailed optical data of the optical imaging lens 10 provided in the second embodiment are as shown in FIG. 12. In addition, the EFL of the optical imaging lens 10 provided in the second embodiment is 1.867 mm, the HFOV thereof is 38.333°, the Fno thereof is 1.100, the system length thereof is 2.965 mm, and the image height thereof is 1.5 mm.

Respective aspheric coefficients of the object-side surface 15 of the first lens element 1 to the image-side surface 46 of the fourth lens element 4 of the second embodiment in the formula (1) are as shown in FIG. 13.

Besides, relations of important parameters in the optical imaging lens 10 according to the second embodiment are as shown in FIG. 30 and FIG. 31.

The longitudinal spherical aberration provided in the second embodiment is shown in FIG. 11A, and imaging point deviations of the off-axis rays in different heights are controlled within a range of ±21 µm. In FIGS. 11B and 11C illustrating the field curvature aberrations, the field curvature aberrations of the three representative wavelengths in the whole field range fall within ±70 µm. The distortion aberration shown in FIG. 11D indicates that the distortion aberration provided in the second embodiment is maintained within a range of ±2.3%. Compared to the first embodiment, the second embodiment demonstrates the good imaging quality even though the system length is reduced to about 2.965 mm.

In view of the above, the advantages of the second embodiment with respect to the first embodiment are as follows: the system length provided in the second embodiment is less than that provided in the first embodiment, and the HFOV provided in the second embodiment is greater than that provided in the first embodiment.

FIG. 14 is a schematic diagram illustrating an optical imaging lens according to a third embodiment of the disclosure, and FIG. 15A to FIG. 15D are diagrams illustrating a longitudinal spherical aberration and various aberrations of the optical imaging lens according to the third embodiment. With reference to FIG. 14, the third embodiment describing the optical imaging lens 10 is similar to the first embodiment, while the difference therebetween lies in the optical data, the aspheric coefficients, and the parameters of the lens elements 1, 2, 3, and 4. To clearly illustrate the drawing, some reference numerals indicating the optical axis regions and the periphery regions similar to those in the first embodiment are omitted in FIG. 14.

Detailed optical data of the optical imaging lens 10 provided in the third embodiment are as shown in FIG. 16, the EFL of the optical imaging lens 10 provided in the third embodiment is 1.836 mm, the HFOV thereof is 38.976°, the Fno thereof is 1.100, the system length thereof is 2.939 mm, and the image height thereof is 1.5 mm.

Respective aspheric coefficients of the object-side surface 15 of the first lens element 1 to the image-side surface 46 of the fourth lens element 4 of the third embodiment in the formula (1) are as shown in FIG. 17.

Besides, relations of important parameters in the optical imaging lens 10 according to the third embodiment are as shown in FIG. 30 and FIG. 31.

The longitudinal spherical aberration provided in the third embodiment is shown in FIG. 15A, and imaging point deviations of the off-axis rays in different heights are controlled within a range of ±23 µm. In FIGS. 15B and 15C illustrating the field curvature aberrations, the field curvature aberrations of the three representative wavelengths in the whole field range fall within ±110 µm. The distortion aberration shown in FIG. 15D indicates that the distortion aberration provided in the third embodiment is maintained within a range of ±2.1%. Compared to the conventional optical imaging lens, the optical imaging lens provided in the third embodiment demonstrates the good imaging quality even though the system length is reduced to about 2.939 mm.

In view of the above, the advantages of the third embodiment with respect to the first embodiment are as follows: the system length provided in the third embodiment is less than that provided in the first embodiment, the HFOV provided in the third embodiment is greater than that provided in the first embodiment, and the distortion aberration provided in the third embodiment is less than that provided in the first embodiment.

Figure 18:
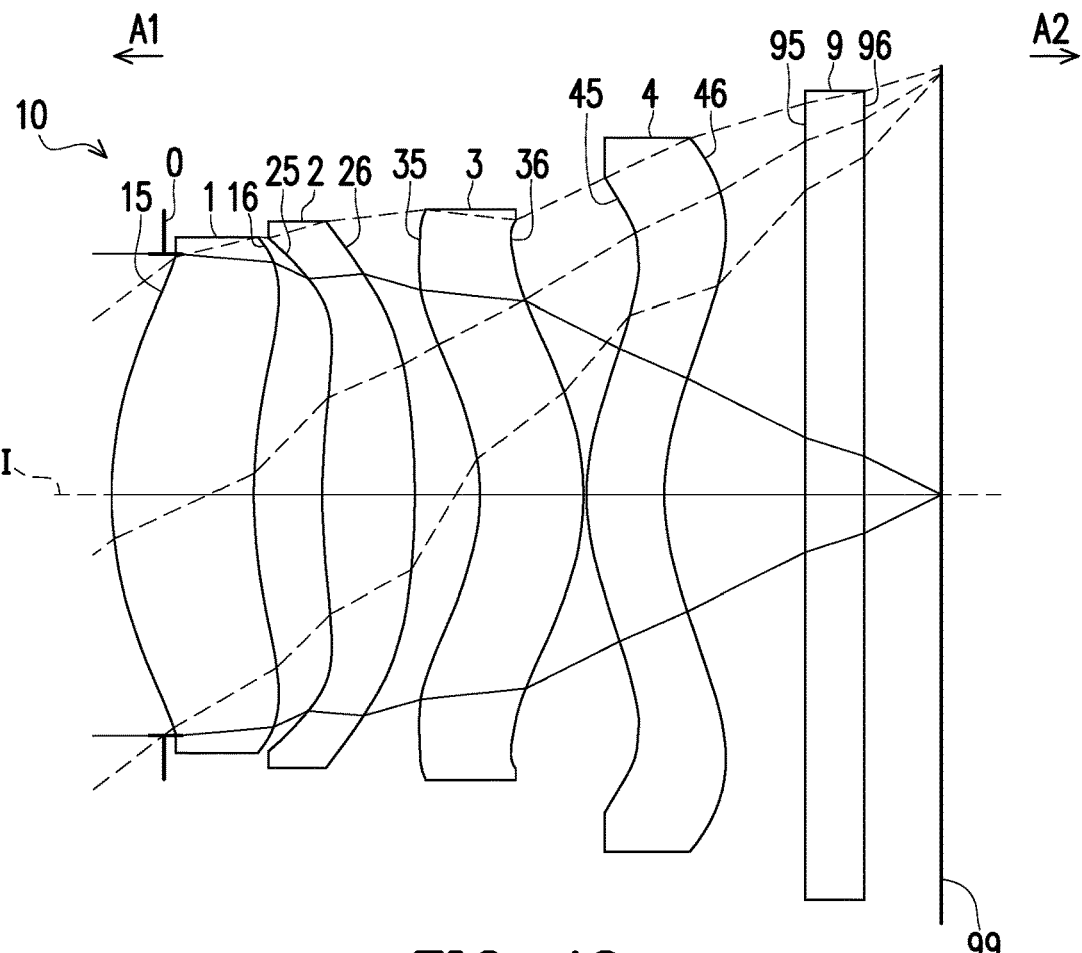
FIG. 18 is a schematic diagram illustrating an optical imaging lens according to a fourth embodiment of the disclosure.

FIG. 18 is a schematic diagram illustrating an optical imaging lens according to a fourth embodiment of the disclosure, and FIG. 19A to FIG. 19D are diagrams illustrating a longitudinal spherical aberration and various aberrations of the optical imaging lens according to the fourth embodiment. With reference to FIG. 18, the fourth embodiment describing the optical imaging lens 10 is similar to the first embodiment, while the difference therebetween lies in the optical data, the aspheric coefficients, and the parameters of the lens elements 1, 2, 3, and 4. To clearly illustrate the drawing, some reference numerals indicating the optical axis regions and the periphery regions similar to those in the first embodiment are omitted in FIG. 18.

Detailed optical data of the optical imaging lens 10 provided in the fourth embodiment are as shown in FIG. 20. In addition, the EFL of the optical imaging lens 10 provided in the fourth embodiment is 1.882 mm, the HFOV thereof is 37.740°, the Fno thereof is 1.100, the system length thereof is 2.947 mm, and the image height thereof is 1.5 mm.

Respective aspheric coefficients of the object-side surface 15 of the first lens element 1 to the image-side surface 46 of the fourth lens element 4 of the fourth embodiment in the formula (1) are as shown in FIG. 21.

Besides, relations of important parameters in the optical imaging lens 10 according to the fourth embodiment are as shown in FIG. 30 and FIG. 31.

Figures 19A, 19B, 19C, 19D:
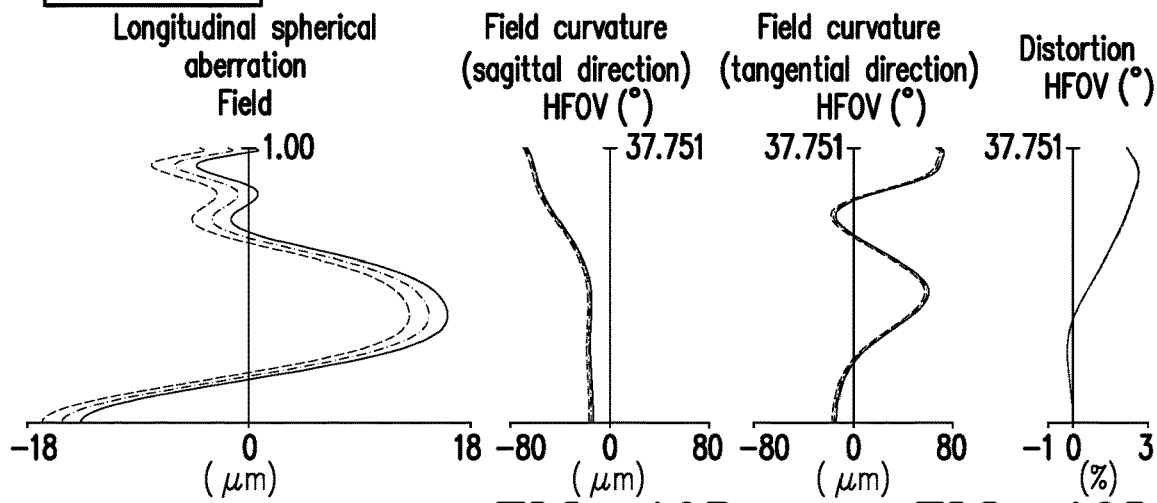
FIG. 19A to FIG. 19D are diagrams illustrating a longitudinal spherical aberration and various aberrations of the optical imaging lens according to the fourth embodiment.

The longitudinal spherical aberration provided in the fourth embodiment is shown in FIG. 19A, and imaging point deviations of the off-axis rays in different heights are controlled within a range of ±17 µm. In FIGS. 19B and 19C illustrating the field curvature aberrations, the field curvature aberrations of the three representative wavelengths in the whole field range fall within ±75 µm. The distortion aberration shown in FIG. 19D indicates that the distortion aberration provided in the fourth embodiment is maintained within a range of ±2.8%. Compared to the first embodiment, the fourth embodiment demonstrates the good imaging quality even though the system length is reduced to about 2.947 mm.

In view of the above, the advantages of the fourth embodiment with respect to the first embodiment are as follows: the system length provided in the fourth embodiment is less than that provided in the first embodiment, and the longitudinal spherical aberration provided in the fourth embodiment is less than that provided in the first embodiment. Besides, the difference in the thickness of each lens element in the optical axis region and the periphery region is minor, and therefore the optical imaging lens provided in the fourth embodiment is, compared to that provided in the first embodiment, easier to be manufactured and has better yield.

FIG. 22 is a schematic diagram illustrating an optical imaging lens according to a fifth embodiment of the disclosure, and FIG. 23A to FIG. 23D are diagrams illustrating a longitudinal spherical aberration and various aberrations of the optical imaging lens according to the fifth embodiment. With reference to FIG. 22, the fifth embodiment describing the optical imaging lens 10 is similar to the first embodiment, while the difference therebetween lies in the Abbe number of the fourth lens element 4 (the Abbe number V4 of the fourth lens element 4 in the fifth embodiment is 55.987, while the Abbe number V4 of the fourth lens element 4 in the first embodiment is 22.409), the optical data, the aspheric coefficients, and the parameters of the lens elements 1, 2, 3, and 4. To clearly illustrate the drawing, some reference numerals indicating the optical axis regions and the periphery regions similar to those in the first embodiment are omitted in FIG. 22.

Detailed optical data of the optical imaging lens 10 provided in the fifth embodiment are as shown in FIG. 24. In addition, the EFL of the optical imaging lens 10 provided in the fifth embodiment is 1.853 mm, the HFOV thereof is 38.403°, the Fno thereof is 1.100, the system length thereof is 2.924 mm, and the image height thereof is 1.5 mm.

Respective aspheric coefficients of the object-side surface 25 of the first lens element 1 to the image-side surface 46 of the fourth lens element 4 of the fifth embodiment in the formula (1) are as shown in FIG. 25.

Besides, relations of important parameters in the optical imaging lens 10 according to the fifth embodiment are as shown in FIG. 30 and FIG. 31.

The longitudinal spherical aberration provided in the fifth embodiment is shown in FIG. 23A, and imaging point deviations of the off-axis rays in different heights are controlled within a range of ±19.5 µm. In FIGS. 23B and 23C illustrating the field curvature aberrations, the field curvature aberrations of the three representative wavelengths in the whole field range fall within ±95 µm. The distortion aberration shown in FIG. 23D indicates that the distortion aberration provided in the fifth embodiment is maintained within a range of ±2.2%. Compared to the first embodiment, the fifth embodiment demonstrates the good imaging quality even though the system length is reduced to about 2.924 mm.

In view of the above, the advantages of the fifth embodiment with respect to the first embodiment are as follows: the system length provided in the fifth embodiment is less than that provided in the first embodiment. Besides, the HFOV provided in the fifth embodiment is greater than that provided in the first embodiment, and the longitudinal spherical aberration provided in the fifth embodiment is less than that provided in the first embodiment. Besides, the difference in the thickness of each lens element in the optical axis region and the periphery region is minor, and therefore the optical imaging lens provided in the fifth embodiment is, compared to that provided in the first embodiment, easier to be manufactured and has better yield.

Figure 26:
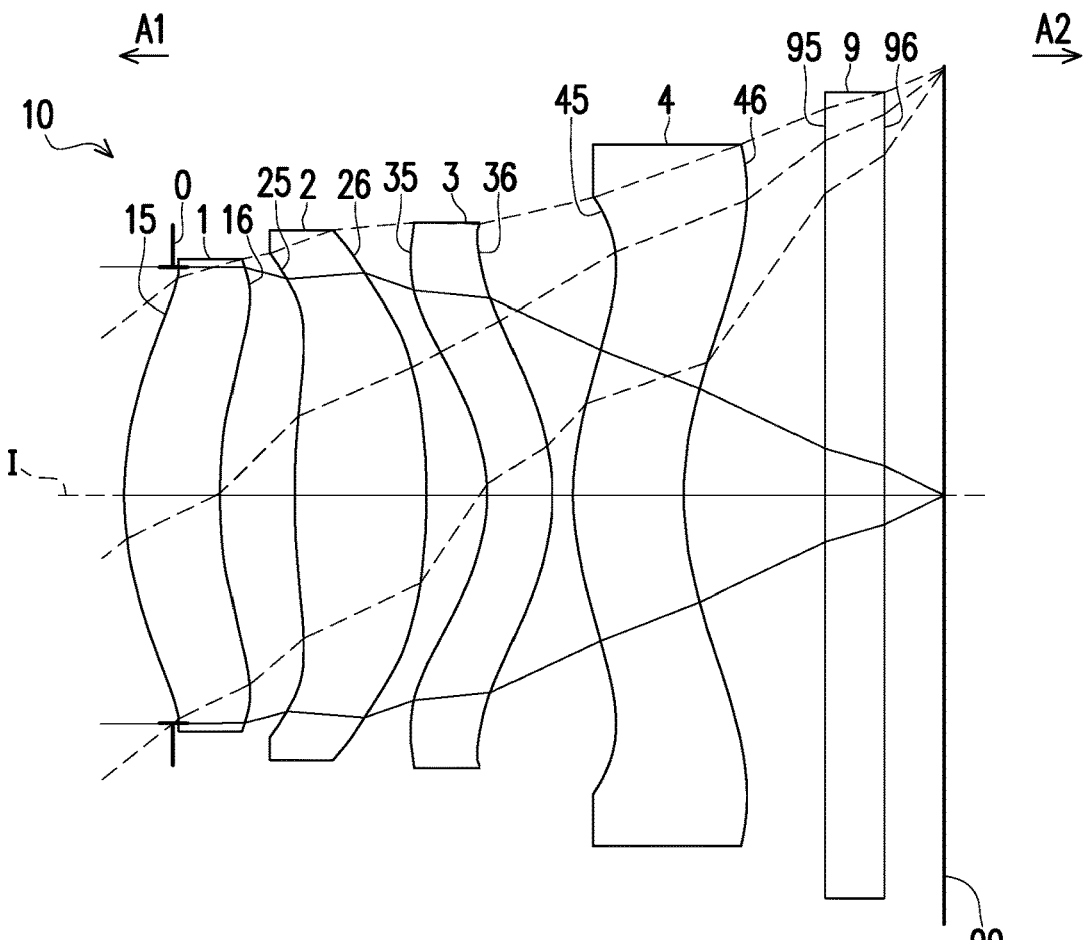
FIG. 26 is a schematic diagram illustrating an optical imaging lens according to a sixth embodiment of the disclosure.

FIG. 26 is a schematic diagram illustrating an optical imaging lens according to a sixth embodiment of the disclosure, and FIG. 27A to FIG. 27D are diagrams illustrating a longitudinal spherical aberration and various aberrations of the optical imaging lens according to the sixth embodiment. With reference to FIG. 26, the sixth embodiment describing the optical imaging lens 10 is similar to the first embodiment, while the difference therebetween lies in the optical data, the aspheric coefficients, and the parameters of the lens elements 1, 2, 3, and 4. To clearly illustrate the drawing, some reference numerals indicating the optical axis regions and the periphery regions similar to those in the first embodiment are omitted in FIG. 26.

Detailed optical data of the optical imaging lens 10 provided in the sixth embodiment are as shown in FIG. 28. In addition, the EFL of the optical imaging lens 10 provided in the sixth embodiment is 1.846 mm, the HFOV thereof is 38.434°, the Fno thereof is 1.150, the system length thereof is 2.895 mm, and the image height thereof is 1.5 mm.

Respective aspheric coefficients of the object-side surface 15 of the first lens element 1 to the image-side surface 46 of the fourth lens element 4 of the sixth embodiment in the formula (1) are as shown in FIG. 29.

Besides, relations of important parameters in the optical imaging lens 10 according to the sixth embodiment are as shown in FIG. 30 and FIG. 31.

Figure 27A:
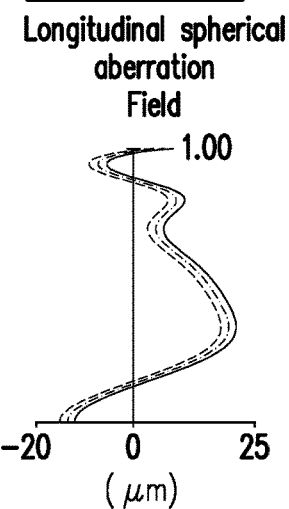
FIG. 27A to FIG. 27D are diagrams illustrating a longitudinal spherical aberration and various aberrations of the optical imaging lens according to the sixth embodiment.
Figure 27B:
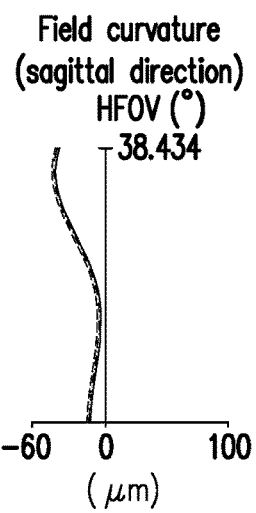
Figure 27C:
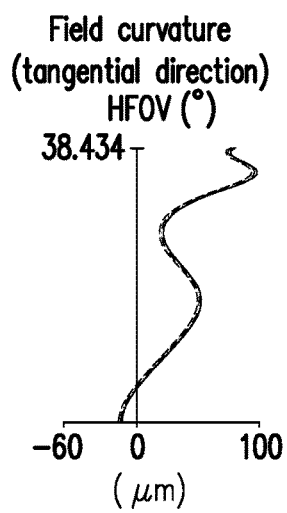
Figure 27D:
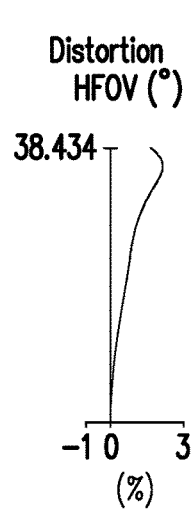

The longitudinal spherical aberration provided in the sixth embodiment is shown in FIG. 27A, and imaging point deviations of the off-axis rays in different heights are controlled within a range of ±22 μm. In FIGS. 27B and 27C illustrating the field curvature aberrations, the focal length variation of the three representative wavelengths in the whole field range falls within ±100 μm. The distortion aberration shown in FIG. 27D indicates that the distortion aberration provided in the sixth embodiment is maintained within a range of ±2.3%. Compared to the first embodiment, the sixth embodiment demonstrates the good imaging quality even though the system length is reduced to about 2.895 mm.

In view of the above, the advantages of the sixth embodiment with respect to the first embodiment are as follows: the system length provided in the sixth embodiment is less than that provided in the first embodiment, and the HFOV provided in the sixth embodiment is greater than that provided in the first embodiment. Besides, the difference in the thickness of each lens element in the optical axis region and the periphery region is minor, and therefore the optical imaging lens provided in the sixth embodiment is, compared to that provided in the first embodiment, easier to be manufactured and has better yield.

FIG. 30 to FIG. 31 are tables showing respective optical parameters according to the first to sixth embodiments of the disclosure.

Through controlling the following parameters, designers are able to design the technical feasible optical imaging lens with good optical performance and reduced effective length:

1. To shorten the system length of the lens elements, the thicknesses of the lens elements and the air gaps between the lens elements are properly reduced in one or more embodiments of the disclosure; however, in consideration of the complexity of assembling the lens elements and the requirement for imaging quality, the thicknesses of the lens elements and the air gaps between the lens elements should both be taken into account, or certain optical parameters in certain combination of lens groups should be adjusted. Hence, the configuration of the optical imaging lens 10 can be optimized while at least one of the following conditions is satisfied:

$(G23+G34)/G12 \geq 0.900$, preferably $0.900 \leq (G23+G34)/G12 \leq 1.400$;

$EFL/T4 \geq 4.000$, preferably $4.000 \leq EFL/T4 \leq 7.700$;

$(T4+AAG)/T1 \leq 3.000$, preferably $1.400 \leq (T4+AAG)/T1 \leq 3.000$;

$V1+V2+V4 \leq 120.000$, preferably $60.000 \leq V1+V2+V4 \leq 120.000$;

$(T1+T2)/(T3+T4) \geq 1.200$, preferably $1.200 \leq (T1+T2)/(T3+T4) \leq 2.200$;

$(T2+T4)/(T3+G12) \geq 2.000$, preferably $0.900 \leq (T2+T4)/(T3+G12) \leq 2.000$;

$(T2+T4)/AAG \leq 2.200$, preferably $1.100 \leq (T2+T4)/AAG \leq 2.200$;

$(T3+AAG)/T4 \geq 1.500$, preferably $1.500 \leq (T3+AAG)/T4 \leq 3.400$;

$ALT/(G12+G23) \leq 4.400$, preferably $2.700 \leq ALT/(G12+G23) \leq 4.400$;

$ALT/AAG \leq 4.000$, preferably $2.300 \leq ALT/AAG \leq 4.000$;

$ALT/(G12+G34) \leq 6.800$, preferably $3.800 \leq ALT/(G12+G34) \leq 6.800$;

$EFL/AAG \leq 4.400$, preferably $3.000 \leq EFL/AAG \leq 4.400$;

$ALT/BFL \leq 1.850$, preferably $1.300 \leq ALT/BFL \leq 1.850$;

$(ALT+EFL)/AAG \leq 8.800$, preferably $5.400 \leq (ALT+EFL)/AAG \leq 8.800$;

$(T1+T2+AAG)/T4 \geq 2.900$, preferably $2.900 \leq (T1+T2+AAG)/T4 \leq 6.000$;

$TL/BFL \leq 2.600$, preferably $1.700 \leq TL/BFL \leq 2.600$;

$BFL/(T3+T4) \geq 1.200$, preferably $1.200 \leq BFL/(T3+T4) \leq 2.100$;

$(AAG+EFL)/(T3+G34) \leq 8.500$, preferably $5.700 \leq (AAG+EFL)/(T3+G34) \leq 8.500$;

$(AAG+T2)/T1 \leq 3.300$, preferably $1.500 \leq (AAG+T2)/T1 \leq 3.300$.

2. In the optical imaging lens 10 provided in one or more embodiments of the disclosure, if $V3 \leq 30.000$ and $T2/T3 \geq 0.9$, the chromatic aberration of the entire optical system can be suppressed, and if said material is selected, the resultant refractive index is high, so as to easily reduce the optical system length. Here, the preferable range of V3 is $20.000 \leq V3 \leq 30.000$, and the preferable range of T2/T3 is $0.900 \leq T2/T3 \leq 2.500$.

Besides, for lens designs having frameworks similar to that of the embodiments of the invention, limitations on the lens may be added by choosing an arbitrary combination/relation of the parameters of the embodiments. Considering the unpredictability in the design of optical system, under the framework of the embodiments provided herein, the optical imaging lens 10 provided in one or more embodiments of the disclosure may have a shorter length, a greater aperture, a larger field of view, an improved imaging quality, or a facilitated assembling yield rate and overcome drawbacks of the conventional optical imaging lenses if the above conditions are satisfied.

An arbitrary number of the exemplary limiting relations listed above may also be arbitrarily and optionally combined and incorporated into the embodiments provided herein, which should however not be construed as limitation in the disclosure. When carrying out the embodiments provided herein, in addition to the above relations, the designer may further set other additional structural details of a specific lens elements or a plurality of lens elements in general, such as arrangements of concave/convex surfaces of lens elements, so as to reinforce the control over the system performance and/or the resolution. It should be noted that these details may be optionally incorporated and applied in other embodiments, if not conflicting.

The range including maximum and minimum numeral values derived from the combinations of the optical parameters disclosed in the embodiments herein and the values between the maximum and minimum numeral values may all be applicable and enable people skilled in the pertinent art to carry out the embodiments of the disclosure.

To sum up, the optical imaging lens 10 provided in one or more embodiments of the disclosure can achieve the following effects and have advantages below:

1. The longitudinal spherical aberration, the astigmatism aberration, and the distortion provided in one or more embodiments of the disclosure all comply with the standard. Besides, the off-axis rays in different heights at the three representative wavelengths 920 nm, 940 nm, and 960 nm are all focused in a vicinity of the imaging point; based on extents of deviation of the curves for the respective wavelengths, the imaging point deviations of the off-axis rays in different heights are well controlled; therefore, the ability of suppressing the spherical aberration, the aberration, and the distortion can be guaranteed. With further reference to the imaging quality data, the distance among the three representative wavelengths 920 nm, 940 nm, and 960 nm is close, which indicates that the concentration of rays at different wavelengths on various conditions is favorable, and the chromatic aberration can be well suppressed according to one or more embodiments provided herein. It can thus be learned that the optical imaging lens provided herein is characterized by good optical performance.

2. In the optical imaging lens 10 provided in one or more embodiments of the disclosure, the periphery region 163 of the image-side surface 16 of the first lens element 1 is designed to be convex, the optical axis region 261 of the image-side surface 26 of the second lens element 2 is designed to be convex, the periphery region 353 of the object-side surface 35 of the third lens element 3 is designed to be convex, the optical axis region 451 of the object-side surface 45 of the fourth lens element 4 is designed to be convex, and the periphery region 454 of the object-side surface 45 of the fourth lens element 4 is designed to be concave. Thereby, the entire optical lens system not only can have the enhanced luminous flux but also can have good imaging quality.

3. Additionally, the lens elements provided herein are made of plastic, which ensures that the weight of the lens can be further reduced, and that the relevant costs can be saved.

It will be apparent to those skilled in the art that various modifications and variations can be made to the structure provided herein without departing from the scope or spirit of the disclosure. In view of the foregoing, it is intended that the present invention cover modifications and variations provided herein, given that they fall within the scope of the following claims and their equivalents.

What is claimed is:

1. An optical imaging lens comprising a first lens element, a second lens element, a third lens element, and a fourth lens element arranged in sequence from an object side to an image side along an optical axis, each of the first lens element to the fourth lens element comprising an object-side surface facing the object side and allowing imaging rays to pass through and an image-side surface facing the image side and allowing the imaging rays to pass through, wherein
a periphery region of the image-side surface of the first lens element is convex,
an optical axis region of the image-side surface of the second lens element is convex,
a periphery region of the object-side surface of the third lens element is convex,
an optical axis region of the object-side surface of the fourth lens element is convex, and a periphery region of the object-side surface of the fourth lens element is concave,
wherein lens elements having refracting power in the optical imaging lens are only said four lens elements, and the optical imaging lens satisfies:

$V3 \leq 30.000$; and $T2/T3 \geq 0.900$, wherein V3 is an Abbe number of the third lens element, T2 is a thickness of the second lens element on the optical axis, and T3 is a thickness of the third lens element on the optical axis.

2. The optical imaging lens according to claim 1, wherein the optical imaging lens further satisfies: $(G23+G34)/G12 \geq 0.900$, wherein G23 is an air gap from the second lens element to the third lens element on the optical axis, G34 is an air gap from the third lens element to the fourth lens element on the optical axis, and G12 is an air gap from the first lens element to the second lens element on the optical axis.

3. The optical imaging lens according to claim 1, wherein the optical imaging lens further satisfies: $EFL/T4 \geq 4.000$, wherein EFL is an effective focal length of the optical imaging lens, and T4 is a thickness of the fourth lens element on the optical axis.

4. The optical imaging lens according to claim 1, wherein the optical imaging lens further satisfies: $(T4+AAG)/T1 \leq 3.000$, wherein T4 is a thickness of the fourth lens element on the optical axis, AAG is a sum of three air gaps from the first lens element to the fourth lens element on the optical axis, and T1 is a thickness of the first lens element on the optical axis.

5. The optical imaging lens according to claim 1, wherein the optical imaging lens further satisfies: $V1+V2+V4 \leq 120.000$, wherein V1 is an Abbe number of the first lens element, V2 is an Abbe number of the second lens element, and V4 is an Abbe number of the fourth lens element.

6. The optical imaging lens according to claim 1, wherein the optical imaging lens further satisfies: $(T1+T2)/(T3+T4)$ 1.200, wherein T1 is a thickness of the first lens element on the optical axis, and T4 is a thickness of the fourth lens element on the optical axis.

7. The optical imaging lens according to claim 1, wherein the optical imaging lens further satisfies: $(T2+T4)/(T3+G12) \leq 2.000$, wherein T4 is a thickness of the fourth lens element on the optical axis, and G12 is an air gap from the first lens element to the second lens element on the optical axis.

8. The optical imaging lens according to claim 1, wherein the optical imaging lens further satisfies: $(T2+T4)/AAG \leq 2.200$, wherein T4 is a thickness of the fourth lens element on the optical axis, and AAG is a sum of three air gaps from the first lens element to the fourth lens element on the optical axis.

9. The optical imaging lens according to claim 1, wherein the optical imaging lens further satisfies: $(T3+AAG)/T4 \geq 1.500$, wherein AAG is a sum of three air gaps from the first lens element to the fourth lens element on the optical axis, and T4 is a thickness of the fourth lens element on the optical axis.

10. The optical imaging lens according to claim 1, wherein the optical imaging lens further satisfies: $ALT/(G12+G23) \leq 4.400$, wherein ALT is a sum of four lens thicknesses of the first lens element to the fourth lens element on the optical axis, G12 is an air gap from the first lens element to the second lens element on the optical axis, and G23 is an air gap from the second lens element to the third lens element on the optical axis.

11. The optical imaging lens according to claim 1, wherein the optical imaging lens further satisfies: $ALT/AAG \leq 4.000$, wherein ALT is a sum of four lens thicknesses of the first lens element to the fourth lens element on the optical axis, and AAG is a sum of three air gaps from the first lens element to the fourth lens element.

12. The optical imaging lens according to claim 1, wherein the optical imaging lens further satisfies: $ALT/(G12+G34) \leq 6.800$, wherein ALT is a sum of four lens thicknesses of the first lens element to the fourth lens element on the optical axis, G12 is an air gap from the first lens element to the second lens element on the optical axis, and G34 is an air gap from the third lens element to the fourth lens element on the optical axis.

13. The optical imaging lens according to claim 1, wherein the optical imaging lens further satisfies: $EFL/AAG \leq 4.400$, wherein EFL is an effective focal length of the optical imaging lens, and AAG is a sum of three air gaps from the first lens element to the fourth lens element on the optical axis.

14. The optical imaging lens according to claim 1, wherein the optical imaging lens further satisfies: $ALT/BFL \leq 1.850$, wherein ALT is a sum of four lens thicknesses of the first lens element to the fourth lens element on the optical axis, and BFL is a distance from the image-side surface of the fourth lens element to an image plane on the optical axis.

15. The optical imaging lens according to claim 1, wherein the optical imaging lens further satisfies: $(ALT+EFL)/AAG \leq 8.800$, wherein ALT is a sum of four lens thicknesses of the first lens element to the fourth lens element on the optical axis, EFL is an effective focal length of the optical imaging lens, and AAG is a sum of three air gaps from the first lens element to the fourth lens element on the optical axis.

16. The optical imaging lens according to claim 1, wherein the optical imaging lens further satisfies: $(T1+T2+AAG)/T4 \leq 2.900$, wherein T1 is a thickness of the first lens element on the optical axis, AAG is a sum of three air gaps from the first lens element to the fourth lens element on the optical axis, and T4 is a thickness of the fourth lens element on the optical axis.

17. The optical imaging lens according to claim 1, wherein the optical imaging lens further satisfies: $TL/BFL \leq 2.600$, wherein TL is a distance from the object-side surface of the first lens element to the image-side surface of the fourth lens element on the optical axis, and BFL is a distance from the image-side surface of the fourth lens element to an image plane on the optical axis.

18. The optical imaging lens according to claim 1, wherein the optical imaging lens further satisfies: $BFL/(T3+T4) \geq 1.200$, wherein BFL is a distance from the image-side surface of the fourth lens element to an image plane on the optical axis, and T4 is a thickness of the fourth lens element on the optical axis.

19. The optical imaging lens according to claim 1, wherein the optical imaging lens further satisfies: $(AAG+EFL)/(T3+G34) \leq 8.500$, wherein AAG is a sum of three air gaps from the first lens element to the fourth lens element on the optical axis, EFL is an effective focal length of the optical imaging lens, and G34 is an air gap from the third lens element to the fourth lens element on the optical axis.

20. The optical imaging lens according to claim 1, wherein the optical imaging lens further satisfies: $(AAG+T2)/T1 \leq 3.300$, wherein AAG is a sum of three air gaps from the first lens element to the fourth lens element on the optical axis, and T1 is a thickness of the first lens element on the optical axis.

* * * * *